United States Patent
Negishi

[11] Patent Number: 6,165,633
[45] Date of Patent: Dec. 26, 2000

[54] METHOD OF AND APPARATUS FOR REFORMING FUEL AND FUEL CELL SYSTEM WITH FUEL-REFORMING APPARATUS INCORPORATED THEREIN

[75] Inventor: Yoshimasa Negishi, Aichi-ken, Japan

[73] Assignee: Toyota Jidosha Kabushiki Kaisha, Toyota, Japan

[21] Appl. No.: 08/800,377

[22] Filed: Feb. 14, 1997

[30] Foreign Application Priority Data

Mar. 26, 1996 [JP] Japan ..................................... 8-097469
Nov. 26, 1996 [JP] Japan ..................................... 8-331455

[51] Int. Cl.[7] .................................................. H01M 8/06
[52] U.S. Cl. ............................... 429/17; 429/20; 423/651
[58] Field of Search ............................... 429/17, 19, 20; 423/651

[56] References Cited

U.S. PATENT DOCUMENTS 2,244,612  6/1941  Crowley, Jr. .
3,976,507  8/1976  Bloomfield ............................... 429/17
4,365,006  12/1982  Baker ...................................... 429/17

FOREIGN PATENT DOCUMENTS 0 112 613    7/1984   European Pat. Off. .
26 46 129    4/1978   Germany .
62-17002     1/1987   Japan .
62-91402     4/1987   Japan .
62-290065   12/1987   Japan .
63-248702   10/1988   Japan .
1-186570     7/1989   Japan .
2-160603     6/1990   Japan .
WO 94 26656 11/1994   WIPO .

*Primary Examiner*—Stephen Kalafut
*Attorney, Agent, or Firm*—Oblon, Spivak, McClelland, Maier & Neustadt, P.C.

[57] ABSTRACT

Methanol supplied as a raw fuel is mixed with water, vaporized in an evaporator 24, and supplied to a reformer 22 as a raw fuel gas. The reformer 22 also receives a supply of the compressed air from an air tank 36. The raw fuel gas is mixed with the compressed air in the reformer 22. An oxidation reaction of methanol supplied as the raw fuel proceeds in the reformer 22 to generate hydrogen and carbon dioxide, while a steam reforming reaction of methanol simultaneously proceeds in the reformer 22 to generate hydrogen and carbon dioxide. The amount of heat required for the endothermic reforming reaction can be supplied by the oxidation reaction of methanol. No external heat source is accordingly required in the reformer 22 to supply the heat required for the reforming reaction.

20 Claims, 13 Drawing Sheets

METHOD OF AND APPARATUS FOR REFORMING FUEL AND FUEL CELL SYSTEM WITH FUEL-REFORMING APPARATUS INCORPORATED THEREIN

BACKGROUND OF THE INVENTION

1. Field of the Invention

The present invention relates to a method of and an apparatus for reforming a fuel and a fuel cell system with the fuel-reforming apparatus incorporated therein. More specifically, the present invention pertains to a fuel-reforming apparatus that reforms a hydrocarbon supplied as a raw fuel to a hydrogen-rich gaseous fuel, which is then supplied to fuel cells. The present invention further pertains to a method of reforming a fuel and a fuel cell system with such a fuel-reforming apparatus incorporated therein.

2. Description of the Prior Art

Fuel cells are a device in which the chemical energy of a fuel is converted, not via mechanical energy or thermal energy, but directly into electrical energy. The fuel cells can thus realize a favorably high energy efficiency. A well-known structure of the fuel cell includes a pair of electrodes arranged across an electrolyte layer. While a gaseous fuel containing hydrogen is supplied to one electrode (cathode), an oxidizing gas containing oxygen is fed to the other electrode (anode). An electromotive force is obtained by taking advantage of electrochemical reactions proceeding at the respective electrodes. Equations representing the electrochemical reactions occurring in the fuel cell are given below. Equations (1) and (2) respectively represent the reaction at the anode and the reaction at the cathode; the reaction expressed as Equation (3) accordingly proceeds as a whole in the fuel cell:

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

Fuel cells are generally classified by the type of the electrolyte used therein, the operation temperature, and the other parameters. Among the various fuel cells, Polymer Electrolyte Fuel Cells, Phosphoric Acid Fuel Cells, and Molten Carbonate Fuel Cells allow supplies of the oxidizing gas and the gaseous fuel containing carbon dioxide, because of the characteristics of their electrolytes. In these fuel cells, the air is generally used as the oxidizing gas, and the hydrogen-containing gas obtained by steam reforming a raw hydrocarbon fuel, such as methanol or natural gas as the gaseous fuel.

The fuel cell system having such fuel cells is accordingly provided with a reformer, which reforms the raw fuel to generate a gaseous fuel. The following gives an exemplified reforming reaction of the raw fuel proceeding in the reformer. In this example, methanol is supplied as the raw fuel and steam reformed:

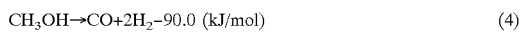

$$CH_3OH \rightarrow CO + 2H_2 - 90.0 \text{ (kJ/mol)} \quad (4)$$

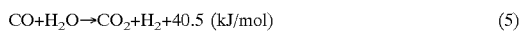

$$CO + H_2O \rightarrow CO_2 + H_2 + 40.5 \text{ (kJ/mol)} \quad (5)$$

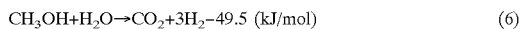

$$CH_3OH + H_2O \rightarrow CO_2 + 3H_2 - 49.5 \text{ (kJ/mol)} \quad (6)$$

In the process of steam reforming methanol, the decomposition of methanol expressed as Equation (4) and the converting reaction of carbon monoxide expressed as Equation (5) occur simultaneously; the reaction expressed as Equation (6) accordingly proceeds as a whole in the reformer. Since the process of steam reforming the raw fuel is an endothermic reaction, the conventional reformer is typically provided with a burner or a heater in order to supply a required amount of heat for the reforming reaction.

In the structure including the burner to supply a required amount of heat for the reforming reaction, however, the burner itself attached to the reformer and additional conduits to feed supplies of a fuel and the air to the burner for combustion make the whole fuel cell system rather complicated and bulky. This is especially unsuitable when the fuel cell system having the fuel cells and the reformer is located in a limited space, for example, when the fuel cell system is mounted on the vehicle as a power source for driving the vehicle. The structure including the heater, on the other hand, requires extra energy for driving the heater, in addition to having the above drawbacks, that is, the complicated and bulky fuel cell system. This leads to a decrease in energy efficiency of the whole fuel cell system. By way of example, in the structure that supplies part of electric power generated by the fuel cells to the heater which is used for heating the reformer, the fuel cells are required to have a sufficiently large capacity.

The conventional reformer can not be favorably applied to the case in which an increase in supply of gaseous fuel is required with the enhanced loading of the fuel cells. The reforming reaction expressed as Equation (6) is an endothermic reaction as discussed above. The endothermic reaction generally has a slower reaction rate, and it is accordingly difficult to abruptly increase the amount of the raw fuel processed by the reforming reaction. The endothermic reforming reaction can be activated by increasing the amount of heat applied to the reformer. An extreme increase in temperature, however, deteriorates the catalyst packed in the reformer and causes other problems. Application of a small amount of heat to prevent deterioration of the catalyst leads to an insufficient effect of activating the reforming reaction. As another possible solution, a reformer of a sufficiently large capacity may be used to readily generate an estimated maximum amount of the reformed gas. This, however, makes the reformer undesirably bulky.

In the structure of heating the reformer with an external heat source, such as a heater, another problem arises; that is, the temperature distribution curve in the reformer has smaller values in the vicinity of the inlet of the reformer and greater values in the vicinity of the outlet. FIG. 21 is a graph showing a temperature distribution in a conventional reformer with a heater. In the conventional reformer, the inside temperature decreases with the progress of the endothermic reforming reaction at the inlet, through which steam and methanol as the raw fuel are introduced. Although the heater continues supplying heat, the temperature in the reformer is decreasing while the endothermic reforming reaction is vigorous to consume a large amount of heat. As the progress of the endothermic reforming reaction becomes gentle with consumption of the raw fuel, the amount of heat supplied by the heater reaches and then exceeds the amount of heat required for the endothermic reaction. The inside temperature of the reformer accordingly starts increasing. A temporary decrease in temperature in the vicinity of the inlet of the reformer lowers the rate of the endothermic reforming reaction and thereby the efficiency per unit volume of the reformer. An increase in temperature in the vicinity of the outlet interferes with the exothermic shift reaction of Equation (5), thereby undesirably increasing the concentration of carbon monoxide included in the gaseous fuel obtained by the reforming reaction.

SUMMARY OF THE INVENTION

One object of the present invention is thus to generate a gaseous fuel having a low content of carbon monoxide.

Another object of the present invention is to provide a sufficiently compact fuel-reforming apparatus and simplify structure of a fuel cell system with a fuel-reforming apparatus incorporated therein.

Still another object of the present invention is to reform a raw fuel gas without lowering an energy efficiency of the whole fuel cell system.

At least part of the above and the other related objects is realized by a method of reforming a hydrocarbon supplied as a raw fuel to generate a hydrogen-containing gaseous fuel through a reforming reaction occurring in a predetermined reformer. The method includes the steps of: feeding a supply of oxygen to a raw fuel gas containing the raw fuel and enabling an exothermic oxidation reaction to proceed for a specified component of the raw fuel gas; and enabling an endothermic reforming reaction of the raw fuel to proceed with heat generated by the exothermic oxidation reaction of the specified component.

The method of the present invention feeds a supply of oxygen to a raw fuel gas containing the raw fuel, so that an exothermic oxidation reaction proceeds to oxidize a specified component of the raw fuel gas. The required amount of heat externally supplied for the reforming reaction of the raw fuel can be lessened significantly by combining the exothermic oxidation reaction with the endothermic reforming reaction and utilizing the heat generated by the exothermic reaction for the endothermic reaction. The principle of this method applied to a fuel-reforming apparatus effectively reduces the size of a heat source arranged in the fuel-reforming apparatus for securing the amount of heat required for the reforming reaction as well as the size of the whole fuel-reforming apparatus.

In accordance with one preferable application, the specified component subjected to the exothermic oxidation reaction is the raw fuel, and the exothermic oxidation reaction represents an oxidizing reforming reaction that oxidizes the raw fuel to reform the raw fuel.

With a supply of oxygen to the raw fuel gas, the oxidizing reforming reaction proceeds to oxidize the raw fuel. The heat generated by the oxidizing reforming reaction is utilized for the endothermic reforming reaction of the raw fuel. The exothermic oxidization reaction for supplying the amount of heat required for the endothermic reforming reaction of the raw fuel also reforms the raw fuel to generate hydrogen. Even when the reaction other than the endothermic reforming reaction occurs to supply the amount of heat required for the reforming reaction, the generation of hydrogen effectively prevents the hydrogen partial pressure of the resulting gaseous fuel from being lowered.

In accordance with one preferable application, the method of the present invention further includes the steps of: determining a proportion of oxygen added to the raw fuel-containing raw fuel gas in the process of the reforming reaction, based on an amount of heat generated by the exothermic oxidation reaction of the specified component of the raw fuel gas and an amount of heat required for the endothermic reforming reaction; and supplying oxygen corresponding to the proportion thus determined being mixed with the raw fuel gas prior to being subjected to the exothermic oxidation reaction.

This structure enables the amount of heat required for the reforming reaction to be sufficiently generated inside the reformer. In case that a predetermined amount of oxygen is added to the raw fuel gas in order to supply all the required amount of heat for the reforming reaction, there is no need of externally supplying heat to secure the required amount of heat for the reforming reaction. When the principle of the method is applied to a fuel-reforming apparatus, no requirement for the heat source effectively reduces the size of the whole fuel-reforming apparatus. Since there is no requirement for not only the heat source itself but piping for supplying a fuel to drive the heat source and wiring for supplying energy, the system with the fuel-reforming apparatus has the preferably simplified structure.

In this preferable structure, the supply of oxygen added to the raw fuel gas is determined, based on the amount of heat generated by the exothermic oxidation reaction and the amount of heat required for the endothermic reforming reaction. This structure enables the amount of heat required for the endothermic reforming reaction to be sufficiently generated and balances the amount of heat generated by the exothermic oxidation reaction of the specified component of the raw fuel gas with the amount of heat required for the endothermic reforming reaction, thereby not causing excess heat. This prevents an unnecessary increase in temperature of the catalyst and thereby the possible energy loss due to heat dissipation.

The proportion of oxygen to the raw fuel gas is determined, based on the amount of heat generated by the oxidation reaction and the amount of heat required for the reforming reaction. This structure effectively prevents the ratio of the oxidation reaction from being unnecessarily expanded. Even in case that the oxidation reaction proceeds to generate components other than hydrogen or in case that the number of hydrogen molecules generated by the oxidation reaction per one molecule of methanol is less than the number of hydrogen molecules generated by the reforming reaction, this structure prevents the hydrogen partial pressure of the resulting gaseous fuel from being undesirably lowered.

In accordance with another preferable structure, a first catalyst having a predetermined heat resistance and being packed in the reformer accelerates at least the exothermic oxidation reaction of the specified component of the raw fuel gas. The raw fuel gas that has undergone the oxidation reaction subsequently comes into contact with a second catalyst that is packed in the reformer for accelerating at least the endothermic reforming reaction.

The first catalyst having a predetermined heat resistance accelerates the exothermic oxidation reaction. The first catalyst accordingly does not deteriorate even when the temperature in the active area of the oxidation reaction rises with the progress of the exothermic oxidation reaction. Since the first catalyst is not easily deteriorated by the temperature increase in the active area of the exothermic oxidation reaction, the oxidation reaction can be activated to a further extent and the size of the reformer can thus be reduced. An improvement in heat generation efficiency per unit volume in the area filled with the first catalyst ensures generation of a sufficient amount of heat even when the area filled with the first catalyst is narrowed.

The raw fuel gas that has undergone the oxidation reaction comes into contact with the second catalyst. The endothermic reforming reaction proceeds on the second catalyst using the heat generated by the preceding oxidation reaction. The reforming reaction, which produces hydrogen from a hydrocarbon, generally includes the reaction of producing carbon dioxide and hydrogen from carbon monoxide and water. This reaction is the exothermic shift reaction, and the lower surrounding temperatures accelerate the shift reaction. As the reforming reaction consuming the heat proceeds in the presence of the second catalyst to lower the temperature in the reformer, the shift reaction is accelerated to reduce the concentration of carbon monoxide and thereby generate a gaseous fuel having a low content of carbon monoxide.

The present invention is further directed to a method of reforming a hydrocarbon supplied as a raw fuel to generate a hydrogen-containing gaseous fuel through a reforming reaction occurring in a predetermined reformer. The method includes the steps of: extending the exothermic oxidation reaction activating area to be arranged in such a way that the exothermic oxidation reaction activating area and the endothermic reforming reaction area overlap each other in a wide range, wherein the exothermic oxidation reaction of a specified component of a raw fuel gas containing the raw fuel is enabled to proceed.

Still another preferable method representing the prevent invention is a method of reforming a hydrocarbon supplied as a raw fuel to generate a hydrogen-containing gaseous fuel through a reforming reaction occurring in a predetermined reformer. The method includes the steps of: feeding a supply of oxygen to a raw fuel gas containing the raw fuel and enabling an exothermic oxidation reaction to proceed for a specified component of the raw fuel gas; and diffusing heat widely over the endothermic reforming reaction area, the heat being generated by the exothermic oxidation reaction of the specified component; and enabling an endothermic reforming reaction of the raw fuel to proceed with the diffused heat.

This structure lowers the peak of the temperature distribution in the reformer and thus prevents a variety of problems caused by an extreme increase in temperature in the reformer. These problems due to an increase in temperature of the reformer to and above a predetermined level include deterioration of the catalyst that is packed in the reformer for accelerating the reforming reaction and generation of non-required by-products by the undesirable reactions other than the oxidation reaction and the reforming reaction. This structure also expands the area having temperatures for activating the endothermic reforming reaction, thus improving the efficiency of the reforming reaction per unit volume of the reformer and reducing the size of the reformer.

The present invention is also directed to an apparatus for reforming a hydrocarbon supplied as a raw fuel to generate a hydrogen-containing gaseous fuel through a reforming reaction. The apparatus of the invention includes: a reformer unit in which the reforming reaction proceeds; raw fuel supply means for feeding a supply of a raw fuel gas containing the raw fuel to the reformer unit; and oxygen supply means for feeding a supply of oxygen to the raw fuel gas. The reformer unit includes: a first catalyst for accelerating an exothermic oxidation reaction of a specified component of the raw fuel gas with the supply of oxygen fed by the oxygen supply means; and a second catalyst for accelerating an endothermic reforming reaction with heat generated by the oxidation reaction of the specified component of the raw fuel gas.

The apparatus of the present invention feeds a supply of oxygen to a raw fuel gas containing the raw fuel, so that an exothermic oxidation reaction proceeds for a specified component of the raw fuel gas. Since the exothermic reaction proceeds inside the apparatus, the endothermic reforming reaction of the raw fuel can be carried out with the heat generated in the apparatus. The required amount of heat externally supplied for the reforming reaction of the raw fuel is thus lessened significantly. This structure can effectively reduce the size of a heat source arranged in the apparatus for securing the amount of heat required for the reforming reaction as well as the size of the whole apparatus.

In accordance with one preferable application, the specified component subjected to the exothermic oxidation reaction is the raw fuel, and the exothermic oxidation reaction represents an oxidizing reforming reaction that oxidizes the raw fuel to reform the raw fuel.

In the apparatus of this preferable structure, the oxidizing reforming reaction proceeds with a supply of oxygen to the raw fuel gas, so as to oxidize the raw fuel. The heat generated by the oxidizing reforming reaction is utilized for the endothermic reforming reaction of the raw fuel. The exothermic oxidization reaction for supplying the amount of heat required for the endothermic reforming reaction of the raw fuel also reforms the raw fuel to generate hydrogen. Even when the reaction other than the reforming reaction occurs to supply the amount of heat required for the reforming reaction, the generation of hydrogen effectively prevents the hydrogen partial pressure of the resulting gaseous fuel from being lowered.

In accordance with another preferable application of the apparatus of the invention, the oxygen supply means includes: oxygen supply regulation means for determining a proportion of oxygen supplied to the raw fuel gas, based on an amount of heat generated by the exothermic oxidation reaction of the specified component of the raw fuel gas and an amount of heat required for the endothermic reforming reaction, and feeding a supply of oxygen corresponding to the proportion thus determined to the raw fuel gas.

In the apparatus of this preferable structure, the supply of oxygen added to the raw fuel gas is determined, based on the amount of heat generated by the exothermic oxidation reaction of the predetermined component of the raw fuel gas and the amount of heat required for the endothermic reforming reaction. This structure enables the amount of heat required for the endothermic reforming reaction to be sufficiently generated inside the reformer unit. In case that a predetermined amount of oxygen is added to the raw fuel gas in order to supply all the required amount of heat for the endothermic reforming reaction, there is no requirement for a heat source that supplies the required amount of heat for the reforming reaction, thereby enabling the size of the whole apparatus to be desirably reduced. Since there is no requirement for not only the heat source itself but piping for supplying a fuel to drive the heat source and wiring for supplying energy, the system with the fuel-reforming apparatus has the preferably simplified structure.

In this preferable structure, the supply of oxygen added to the raw fuel gas is determined, based on the amount of heat generated by the exothermic oxidation reaction of the predetermined component of the raw fuel gas and the amount of heat required for the endothermic reforming reaction as discussed above. This structure enables the amount of heat required for the endothermic reforming reaction to be sufficiently generated and balances the amount of heat generated by the exothermic oxidation reaction of the predetermined component of the raw fuel gas with the amount of heat required for the endothermic reforming reaction, thereby not causing excess heat. This prevents an unnecessary increase in temperature of the catalyst and thereby the possible energy loss due to heat dissipation.

The proportion of oxygen to the raw fuel gas is determined, based on the amount of heat generated by the exothermic oxidation reaction and the amount of heat required for the endothermic reforming reaction. This structure effectively prevents the ratio of the oxidation reaction from being unnecessarily expanded. Even in case that the exothermic oxidation reaction proceeds to generate components foreign to the cell reaction of the fuel cells or in case that the number of hydrogen molecules generated by the oxidation reaction per one molecule of methanol is less than the number of hydrogen molecules generated by the reforming reaction, this structure prevents the hydrogen partial pressure of the resulting gaseous fuel from being undesirably lowered.

In the apparatus of the present invention, it is also preferable that the first catalyst and the second catalyst are identical with each other, and the reformer unit has a homogeneous catalyst layer composed of the first catalyst and the second catalyst.

In this preferable structure, the single catalyst functions to accelerate both the exothermic oxidation reaction of the specified component of the raw fuel gas and the reforming reaction. This simplifies the structure of the apparatus and accordingly eases the manufacturing process of this apparatus. The reforming reaction can proceed simultaneously in the active area of the oxidation reaction. The endothermic reaction occurring simultaneously with the exothermic reaction improves the efficiency of the reforming reaction per unit volume of the apparatus. The improvement in efficiency of the endothermic reforming reaction enables the size of the apparatus to be reduced desirably. In the active area of the exothermic oxidation reaction and the simultaneous endothermic reforming reaction, the heat generated by the exothermic oxidation reaction is consumed immediately by the endothermic reforming reaction. This structure effectively prevents the possible energy loss due to transmission of heat generated by the exothermic oxidation reaction to the active area of the endothermic reforming reaction.

In accordance with another preferable application, the first catalyst has both or either of a predetermined heat resistance and durability at high temperatures, and is arranged at a position closer to an inlet of the raw fuel gas fed into the reformer unit than a position of arrangement of the second catalyst.

Even when the oxidation reaction of the specified component of the raw fuel gas proceeds to generate a large amount of heat, the first catalyst does not deteriorate. In the reformer unit, a large quantity of oxygen can thus be supplied to the area filled with the first catalyst in order to activate the exothermic oxidation reaction. This improves the efficiency of the exothermic oxidation reaction per unit volume in the area filled with the first catalyst and thereby reduces the size of the reformer unit and the whole apparatus. This structure also improves the durability of the apparatus.

The first catalyst is arranged at the position closer to the inlet of the reformer unit than the position of the second catalyst. The exothermic oxidation reaction accordingly proceeds prior to the endothermic reforming reaction. The endothermic reforming reaction lowers the temperature in the vicinity of the outlet of the reformer unit. The reforming reaction, which produces hydrogen from a hydrocarbon, generally includes the reaction of producing carbon dioxide and hydrogen from carbon monoxide and water. This reaction is the exothermic shift reaction, and the lower surrounding temperatures accelerate the shift reaction. As the reforming reaction consuming the heat proceeds in the vicinity of the outlet of the reformer unit to lower the temperature in the reformer unit, the shift reaction is accelerated to reduce the concentration of carbon monoxide and thereby generate a gaseous fuel having a low content of carbon monoxide.

In accordance with one preferable application, the apparatus of the invention further includes temperature distribution averaging means for lowering a peak of a temperature distribution caused by heat generated by the exothermic oxidation reaction of the specified component of the raw fuel gas in the reformer unit and expanding an area having temperatures for activating the endothermic reforming reaction.

In this preferable structure, the amount of heat generated by the exothermic oxidation reaction is averaged and distributed in the reformer unit. This structure prevents the temperature in the reformer unit from rising locally, and the catalyst packed in the reformer unit accordingly does not deteriorate. Averaging the temperature in the reformer unit raises the temperature of the non-active area of the exothermic oxidizing reforming reaction. The endothermic reforming reaction occurs in such an area and is activated with an increase in temperature. The process of averaging the temperature in the reformer unit improves the efficiency of the reforming reaction per unit volume of the reformer unit and thereby reduces the size of the whole apparatus.

In accordance with one preferable structure, the temperature distribution averaging means may include a plurality of the oxygen supply means arranged along a flow of the raw fuel gas in the reformer unit. In this structure, oxygen is supplied from a plurality of different positions into the reformer unit, and the activity curve of the exothermic oxidation reaction accordingly has a plurality of peaks. Upon condition that the supply of oxygen to the reformer unit is fixed, the structure of supplying oxygen from plural positions effectively lowers the peak temperature and increases the number of peaks of the temperature increase, compared with the structure of supplying oxygen from only one position. This expands the area having temperatures equal to or greater than a predetermined level. This structure prevents the temperature in the reformer unit from rising locally, and thereby protects the catalyst from deterioration. The expansion of the active area of the endothermic reforming reaction improves the efficiency of the reforming reaction proceeding in the reformer unit.

In accordance with another preferable structure, the temperature distribution averaging means may include heat dispersion means for dispersing heat generated by the exothermic oxidation reaction of the predetermined component through heat transmission in the reformer unit. This structure disperses the heat generated in the area where the exothermic oxidation reaction reaches its peak, thereby preventing the temperature in the reformer unit from rising locally and protecting the catalyst from deterioration. The heat generated by the exothermic oxidation reaction is dispersed in the reformer unit and raises the temperature of the non-active area of the exothermic oxidation reaction, so as to active the endothermic reforming reaction in this area. This improves the efficiency of the reforming reaction per unit volume of the reformer unit and reduces the size of the whole apparatus.

In accordance with still another preferable application, the temperature distribution averaging means includes the reformer unit having a first portion close to inlets of the raw fuel gas and oxygen and a second portion close to an outlet of the gaseous fuel generated by the reforming reaction, wherein a total surface area of the catalyst existing in the first portion is smaller than a total surface area of the catalyst existing in the second portion. This structure depresses the rate of the exothermic oxidation reaction in the first portion that is close to the inlets of the raw fuel gas and oxygen and has the smaller total surface area. The rate of the exothermic oxidation reaction is generally higher than the rate of the endothermic reforming reaction. In the first portion close to the inlet of oxygen, the amount of heat generated by the exothermic oxidation reaction exceeds the amount of heat required for the endothermic reforming reaction to raise the temperature in the reformer unit. The change of the total surface area of the catalyst in the first portion close to the inlets of the raw fuel gas and oxygen to depress the rate of the exothermic oxidation reaction relieves the temperature increase due to the exothermic oxidation reaction and accordingly averages the temperature distribution inside the reformer unit. A simple process of, for example, varying the particle size of the pellets of the catalytic metal packed in the reformer unit between the inlet of the raw fuel gas and the outlet of the resulting gaseous fuel averages the temperature distribution in the reformer unit without making the structure of the apparatus or piping undesirably complicated. This effectively prevents deterioration of the catalyst due to the high temperatures in the reformer unit and improves the efficiency of the reforming reaction per unit volume of the reformer unit.

In accordance with another preferable application, the temperature distribution averaging means includes the reformer unit having a first portion close to inlets of the raw fuel gas and oxygen and a second portion close to an outlet of the gaseous fuel generated by the endothermic reforming reaction, wherein the first portion has a greater flow sectional area than that of the second portion. The flow rate of the raw fuel gas is lowered in the first portion that is close to the inlet of the raw fuel gas and has the greater sectional area of the flow path, whereas the flow rate of the resulting gaseous fuel is heightened in the second portion that is close to the outlet of the gaseous fuel and has the smaller sectional area of the flow path. This structure depresses the rate of the exothermic oxidation reaction proceeding in the first portion of the reformer unit close to the inlet of the raw fuel gas, which flows relatively slowly. The depression of the rate of the exothermic oxidation reaction reduces the relative rate of the oxidation reaction to the reforming reaction. This relieves the temperature increase due to the exothermic oxidation reaction and accordingly averages the temperature distribution inside the reformer unit. A simple process of, for example, making the flow section of the first portion close to the inlet of the raw fuel gas greater than that of the second portion close to the outlet of the gaseous fuel averages the temperature distribution in the reformer unit without making the structure of the apparatus or piping undesirably complicated. This effectively prevents deterioration of the catalyst due to the high temperatures in the reformer unit and improves the efficiency of the reforming reaction per unit volume of the reformer unit.

The flow section of the reformer represents a plane perpendicular to the direction of the gas flow in the reformer unit. As long as the area of the plane perpendicular to the flow direction of the gas is gradually decreased, it is not required to fix the direction of the gas flow in the reformer unit where the first portion close to the inlet of the raw fuel gas has the greater flow sectional area than that of the second portion close to the outlet of the gaseous fuel. By way of example, the reformer unit may be formed in a columnar shape, wherein the raw fuel gas is introduced from the outer face of the column and the resulting gaseous fuel is discharged to the central axis of the column. This structure can gradually decrease the area of the plane perpendicular to the direction of the gas flow.

The present invention is further directed to a fuel cell system, which includes a fuel-reforming apparatus of the present invention discussed above and a fuel cell for receiving a supply of gaseous fuel from the fuel-reforming apparatus and generating electrical energy.

In the fuel cell system of the present invention, the endothermic reforming reaction proceeds with the heat generated by the exothermic oxidation reaction of the specified component of the raw fuel gas. The required amount of heat externally supplied for the reforming reaction of the raw fuel is thus lessened significantly. Especially when the supply of oxygen fed to the reformer unit of the fuel-reforming apparatus is determined, based on the amount of heat generated by the exothermic oxidation reaction and the amount of heat required for the endothermic reforming reaction, all the required amount of heat for the reforming reaction can be sufficiently generated by the oxidation reaction. There is accordingly no requirement for a heat source that supplies the required amount of heat for the reforming reaction, thereby enabling the size of the apparatus incorporated in the fuel cell system to be desirably reduced. No requirement for not only the heat source itself but piping for supplying a fuel to drive the heat source and wiring for supplying energy simplifies the structure of the fuel cell system of the present invention and improves the energy efficiency in the system.

In accordance with one preferable application, the fuel-reforming apparatus incorporated in the fuel cell system may have heat dispersion means for dispersing heat through heat transmission in the reformer unit, in order to lower the peak of the temperature distribution and expand the area having temperatures equal to or greater than a predetermined level. This structure effectively deals with an abrupt increase in loading of the fuel cell arranged in the fuel cell system without delay. In case that an abrupt activation of the reforming reaction is desired in the fuel-reforming apparatus, for example, at the time of starting the fuel cell system, even when a large amount of oxygen is supplied corresponding to the large amount of raw fuel gas, the heat dispersion means disperses the heat generated by the exothermic oxidation reaction and prevents deterioration of the catalyst and other problems due to a temporary or local extreme increase in temperature in the reformer unit. This structure enables a large amount of raw fuel gas to be reformed within a short time period and supplies the required amount of resulting gaseous fuel to the fuel cell without delay.

Other possible applications of the present invention are given below. In the apparatus and the method according to the present invention, the predetermined component subjected to the oxidation reaction may be carbon monoxide and/or hydrogen generated by the decomposition of the raw fuel.

Decomposition of a hydrocarbon generally produces carbon monoxide and hydrogen. A wide range of hydrocarbons can be used as the raw fuel in the method and the apparatus of the present invention by utilizing the heat generated by the oxidation reaction of carbon monoxide and/or hydrogen.

As another application, the fuel cell system of the present invention may be mounted on an electric vehicle as a power source for driving the vehicle.

The fuel cell system of the present invention can be used preferably as a portable power source when the allowable space and weight are strictly restricted. Generation of the heat required for the simultaneous reforming reaction in the reformer unit simplifies the structure of the system and reduces the weight of the whole system. The electric vehicle with such a fuel cell system has various advantages, such as easy maintenance, the reduced number of parts, simplified assembly, and reduced manufacturing cost.

These and other objects, features, aspects, and advantages of the present invention will become more apparent from the following detailed description of the preferred embodiments with the accompanying drawings.

BRIEF DESCRIPTION OF THE DRAWINGS

FIG. 5 schematically shows structure of another reformer 22a;

FIG. 6 is a graph showing a temperature distribution in the reformer 22a;

DESCRIPTION OF THE PREFERRED EMBODIMENTS

Figure 1:
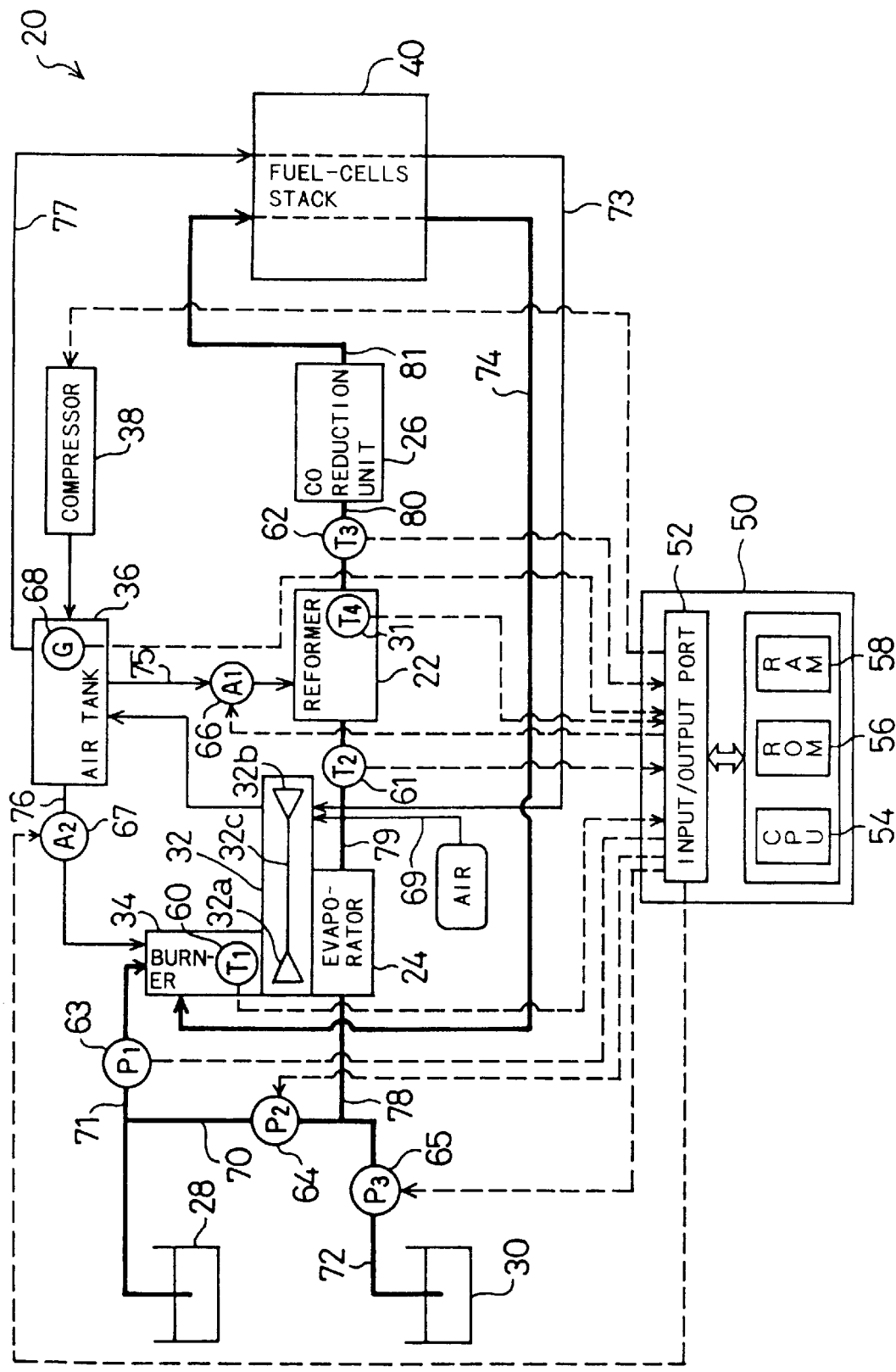
FIG. 1 is a block diagram schematically illustrating structure of a fuel cell system 20 embodying the present invention.

Modes of carrying out the present invention are described below as preferred embodiments. FIG. 1 is a block diagram schematically illustrating structure of a fuel cell system 20 embodying the present invention. The fuel cell system 20 includes as primary constituents a methanol tank 28 for storing methanol, a water tank 30 for storing water, a burner 34 for generating a combustion gas, a compressor 32 for compressing the air, an evaporator 24 with the burner 34 and the compressor 32 mounted thereon, a reformer 22 for generating a gaseous fuel through the reforming reaction, a CO reduction unit 26 for reducing the concentration of carbon monoxide included in the gaseous fuel, a fuel-cells stack 40 for generating an electromotive force through the electrochemical reaction, an air tank 36 for storing the compressed air, a compressor 38 for feeding an auxiliary supply of the compressed air, and a control unit 50 utilizing a computer. The structure of the fuel-cells stack 40 working as a generator in the fuel cell system 20 is described first.

Figure 2:
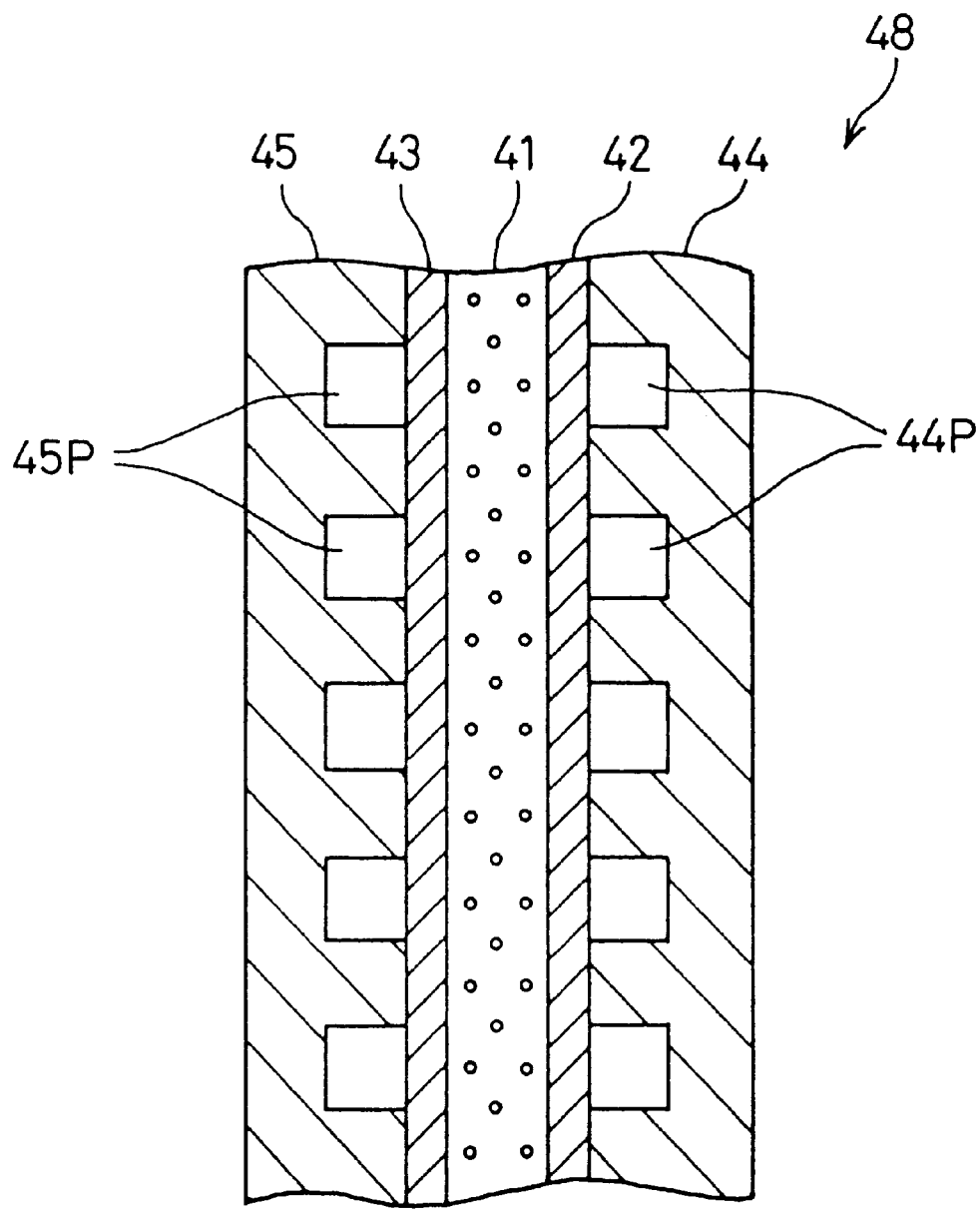
FIG. 2 is a cross sectional view illustrating structure of each unit cell 48 included in a fuel-cells stack 40.

The fuel-cells stack 40 used in this embodiment is a stack of Polymer Electrolyte Fuel Cells and includes a number of unit cells 48 layered one over another. FIG. 2 is a cross sectional view illustrating structure of each unit cell 48 included in the fuel-cells stack 40. The unit cell 48 includes an electrolyte membrane 41, an anode 42, a cathode 43, and separators 44 and 45.

The anode 42 and the cathode 43 are gas diffusion electrodes arranged across the electrolyte membrane 41 to construct a sandwich-like structure. The separators 44 and 45 are disposed outside the sandwich-like structure and combined with the anode 42 and the cathode 43 to form flow paths of a gaseous fuel and an oxidizing gas. The anode 42 and the separator 44 define flow paths 44P of gaseous fuel, whereas the cathode 43 and the separator 45 define flow paths 45P of oxidizing gas. Although the separators 44 and 45 respectively form the flow paths on their single side faces in the drawing of FIG. 2, ribs are formed on either side faces of each separator in the actual state. Namely one side face of each separator combined with the anode 42 forms the flow paths 44P of gaseous fuel, while the other side face combined with the cathode 43 of an adjoining unit cell forms the flow paths 45P of oxidizing gas. The separators 44 and 45 are combined with the gas diffusion electrodes to define gas flow paths and separate flows of the gaseous fuel and the oxidizing gas in the adjoining unit cells. In the process of laying a number of unit cells 48 one upon another to form a stack structure, the two separators located on both ends of the stack structure may have ribs only on their single side faces coming into contact with the gas diffusion electrodes.

The electrolyte membrane 41 is a proton-conductive ion-exchange membrane composed of a solid polymer material, such as fluororesin, and shows favorable electrical conductivity in the wet state. In this embodiment, a Nafion membrane (manufactured by du Pont) is applied for the electrolyte membrane 41. The surface of the electrolyte membrane 41 is coated with platinum or a platinum-containing alloy functioning as a catalyst. The process adopted in this embodiment to apply the catalyst prepares carbon powder with platinum or a platinum-containing alloy carried thereon, disperses the catalyst-carried carbon powder into an appropriate organic solvent, adds a desired amount of an electrolyte solution (for example, Nafion solution manufactured by Aldrich Chemical Corp.) to the dispersion to form a paste, and screen-prints the paste on the electrolyte membrane 41. Another preferably applicable method forms the paste containing the catalyst-carried carbon powder to a sheet and presses the sheet onto the electrolyte membrane 41.

The anode 42 and the cathode 43 are made of carbon cloth, which is woven of yarns consisting of carbon fibers. Although the anode 42 and the cathode 43 are composed of carbon cloth in this embodiment, carbon paper or carbon felt consisting of carbon fibers are also favorably applicable for the material of the anode 42 and the cathode 43.

The separators 44 and 45 are made of a gas-impermeable conductive material, for example, gas-impermeable, dense carbon obtained by compressing carbon. Each of the separators 44 and 45 has a plurality of ribs arranged in parallel and formed on both side faces thereof. As discussed previously, each separator is combined with the surface of the anode 42 to define the flow paths 44P of gaseous fuel and with the surface of the cathode 43 of the adjoining unit cell to define the flow paths 45P of oxidizing gas. In accordance with another possible structure, the ribs formed on one side face of each separator may be arranged perpendicular to or at a certain angle with those formed on the other side face of the separator. As long as the gaseous fuel and the oxidizing gas can be supplied to the gas diffusion electrodes, the ribs may not be formed as parallel grooves.

As discussed above, each unit cell 48 has the separator 44, the anode 42, the electrolyte membrane 41, the cathode 43, and the separator 45, which are arranged in this order. The fuel-cells stack 40 is obtained by stacking plural sets of such unit cells 48 (100 sets in this embodiment) and arranging current collector plates (not shown), which are made of dense carbon or copper plates, on both ends of the stack structure.

Referring back to the drawing of FIG. 1, the following describes the constituents of the fuel cell system 20 other than the fuel-cells stack 40 and their connections. The evaporator 24 receives supplies of methanol and water respectively fed from the methanol tank 28 and the water tank 30 and vaporizes the supplied methanol and water. The evaporator 24 is provided with the burner 34 and the compressor 32 as mentioned previously. The heat of combustion is supplied from the burner 34 via the compressor 32 to a heat exchanger (not shown) included in the evaporator 24, so as to boil and vaporize methanol and water fed to the evaporator 24, which will be described in detail later.

A methanol flow path 70, through which a supply of methanol is fed as the raw fuel from the methanol tank 28 to the evaporator 24, is provided with a second pump 64 that functions to adjust the quantity of methanol supplied to the evaporator 24. The second pump 64 is electrically connected to the control unit 50 and driven by signals output from the control unit 50 to regulate the quantity of methanol supplied to the evaporator 24.

A water flow path 72, through which a supply of water is fed from the water tank 30 to the evaporator 24, is provided with a third pump 65 that functions to adjust the quantity of water supplied to the evaporator 24. Like the second pump 64, the third pump 65 is electrically connected to the control unit 50 and driven by signals output from the control unit 50 to regulate the quantity of water supplied to the evaporator 24. The methanol flow path 70 and the water flow path 72 meet each other to form a first fuel supply conduit 78, which is connected with the evaporator 24. A mixture including a certain amount of methanol regulated by the second pump 64 and a certain amount of water regulated by the third pump 65 is accordingly fed via the first fuel supply conduit 78 to the evaporator 24.

The compressor 32 mounted on the evaporator 24 receives an oxidizing exhaust gas discharged from the fuel-cells stack 40, compresses the oxidizing exhaust gas, and supplies the compressed exhaust gas to the air tank 36. The compressor 32 has a turbine element 32a and a compressor element 32b, which are formed as impellers. The turbine element 32a and the compressor element 32b are linked with each other via a coaxial shaft 32c, so that rotation of the turbine element 32a leads to a rotation of the compressor element 32b. The evaporator 24 is also provided with the burner 34, which gives the high temperature combustion gas to the compressor 32 to drive the turbine element 32a.

The compressor element 32b rotates with the rotation of the turbine element 32a and compresses the oxygen-containing gas circulated through the fuel cell system 20. The compressor element 32b receives the fresh air via an air feed conduit 69 as well as the oxidizing exhaust gas, which is discharged from the oxygen electrodes of the fuel-cells stack 40, via an oxidizing exhaust gas conduit 73. The oxidizing exhaust gas passing through the fuel-cells stack 40 has a predetermined raised temperature and a predetermined pressure. The oxidizing exhaust gas having such energy advantage is taken into the fuel cell system 20 again and reused as the oxygen-containing gas. Since a predetermined amount of oxygen has already been consumed in the fuel-cells stack 40, the oxygen content of the oxidizing exhaust gas is naturally less than that of the air. A certain amount of oxygen included in the oxygen-containing gas circulated through the fuel cell system 20 is consumed by the burner 34 and the reformer 22 as discussed later. The compressor element 32b accordingly receives the fresh air as well as the oxidizing exhaust gas to assure the sufficient supplies of oxygen fed to predetermined portions of the fuel cell system 20. Although the gaseous mixture of the fresh air and the oxidizing exhaust gas is actually compressed by the compressor element 32b, the gas compressed by the compressor element 32b is hereinafter simply referred to as the compressed air.

The turbine element 32a, which is driven to rotate by the high temperature combustion gas fed from the burner 34, is composed of a material having sufficient heat resistance and durability, such as super alloy or ceramics. In this embodiment, the turbine element 32a is made of a nickel-based alloy (Inconel 700 manufactured by Inconel Corp.) The compressor 32b is composed of a light-weight aluminum alloy.

The pressurized, compressed air is sent to the air tank 36 and subsequently supplied to the burner 34, the oxygen electrodes of the fuel-cells stack 40, and the reformer 22 as discussed later. The air tank 36 is provided with a pressure sensor 68 for measuring the air pressure in the air tank 36 and with a compressor unit 38 for supplying the air when the amount of the air in the air tank 36 is insufficient. The pressure sensor 68 is electrically connected to the control unit 50. The control unit 50 determines whether or not the amount of the air in the air tank 36 is sufficient based on the input signal sent from the pressure sensor 58, and outputs a driving signal to the compressor unit 38 when determining that the amount of the air is insufficient, so as to allow an adequate amount of the compressed air to be supplied into the air tank 36. While the fuel cell system 20 is driven in the stationary state, the sufficient amount of the compressed air is supplied from the compressor 32 to the air tank 36. The compressor unit 38 is thus mainly used at the time of starting the system or on other required occasions.

The burner 34 for driving the turbine element 32a receives the fuel for combustion from the cathodes of the fuel-cells stack 40 and the methanol tank 28. The fuel-cells stack 40 receives the hydrogen-rich gas, which is obtained by reforming methanol by the reformer 22, as a fuel and carries out the electrochemical reaction. All the hydrogen supplied to the fuel-cells stack 40 is not consumed, but a fuel exhaust gas containing the remaining hydrogen is discharged from a fuel exhaust conduit 74. The burner 34, which is connected with the fuel exhaust conduit 74, receives the discharged fuel exhaust gas and completely combusts the remaining hydrogen in the fuel exhaust gas, so as to improve the utilization factor of the fuel. When the fuel component in the fuel exhaust gas is not sufficient or when there is no supply of fuel exhaust gas from the fuel-cells stack 40, for example, at the time of starting the fuel cell system 20, the burner 34 receives a supply of methanol from the methanol tank 28. A methanol branch path 71 is arranged to supply methanol to the burner 34. The methanol branch path 71 is branched from the methanol flow path 70 for supplying methanol from the methanol tank 28 to the evaporator 24.

The burner 34 receives oxygen required for combustion, in addition to the above fuel. The oxygen required for combustion is fed as the compressed air from the air tank 36 via a second air supply conduit 76. The second air supply conduit 76 has a second flow regulator 67, which receives a driving signal output from the control unit 50 and regulates the amount of the compressed air supplied to the burner 34.

The burner 34 is provided with a first temperature sensor 60 that measures the temperature of the heat of combustion in the burner 34 and outputs the result of measurement as an electric signal to the control unit 50. The control unit 50 outputs driving signals to a first pump 63 and the second flow regulator 67 based on the input data from the first temperature sensor 60 and regulates the amount of methanol and the amount of the compressed air fed to the burner 34, so as to keep the temperature of combustion in the burner 34 within a predetermined range (that is, approximately 800° C. to 1000° C.). The combustion gas supplied from the burner 34 drives and rotates the turbine element 32*a* and is subsequently led into the evaporator 24. Since the heat exchange efficiency in the turbine element 32*a* is not significantly high (less than approximately 10%), the temperature of the combustion gas led into the evaporator 24 reaches approximately 600 to 700° C., which is sufficient as the heat source of the evaporator 24. The high temperature combustion gas of the burner 34 supplied to the evaporator 24 vaporizes the solution mixture of methanol and water supplied via the first fuel supply conduit 78. The raw fuel gas including methanol and water vaporized by the evaporator 24 is then fed into the reformer 22 via a second fuel supply conduit 79.

The reformer 22 reforms the raw fuel gas including the vaporized methanol and water to a hydrogen-rich gaseous fuel. The structure of the reformer 22 and the reforming reaction occurring in the reformer 22 are essential parts of the present invention and will be described in detail later. The second fuel supply conduit 79 for supplying the raw fuel gas including the vaporized methanol and water to the reformer 22 is provided with a second temperature sensor 61 that measures the temperature of the raw fuel gas. The result of measurement is input as an electric signal into the control unit 50 via a predetermined conducting line. The control unit 50 receives the signal from the first temperature sensor 60 that measures the temperature of the heat of combustion in the burner 34 as well as the signal from the second temperature sensor 61, determines the internal state of the evaporator 24 based on these input signals, and drives the second pump 64 and the third pump 65 to regulate the quantities of methanol and water supplied to the evaporator 24 and thereby regulate the temperature of the raw fuel gas vaporized in the evaporator 24. The raw fuel gas supplied from the evaporator 24 generally has the raised temperature of approximately 250° C.

As discussed later, oxygen is involved in the reforming reaction proceeding in the reformer 22. In order to supply oxygen required for the reforming reaction, the compressed air can be fed as the oxidizing gas from the air tank 36 to the reformer 22 via a first air supply conduit 75. The first air supply conduit 75 is provided with a first flow regulator 66, which receives a driving signal output from the control unit 50 via a predetermined conducting line and regulates the amount of the oxidizing gas supplied to the reformer 22.

The hydrogen-rich gaseous fuel generated by the reformer 22 is led into the CO reduction unit 26 via a third fuel supply conduit 80. A third temperature sensor 62 disposed in the third fuel supply conduit 80 measures the temperature of the gaseous fuel discharged from the reformer 22 and gives the result of measurement as an electric signal to the control unit 50 via a predetermined conducting line. The control unit 50 determines the reaction temperature in the reformer 22 based on the input signal from the third temperature sensor 62 and outputs the driving signal to the first flow regulator 66, so as to regulate the amount of the air fed into the reformer 22. As discussed later, the regulation of the amount of the air supplied to the reformer 22 controls the state of the reforming reaction proceeding in the reformer 22, thereby regulating the internal temperature of the reformer 22.

The CO reduction unit 26 is a device for reducing the concentration of carbon monoxide included in the gaseous fuel supplied from the reformer 22 via the third fuel supply conduit 80. The typical reforming reaction of methanol is expressed as Equations (4) through (6) above. In the actual state, however, the reforming reaction expressed as these Equations does not proceed ideally in the reformer 22, but the gaseous fuel generated by the reformer 22 contains a certain amount of carbon monoxide. The CO reduction unit 26 then functions to reduce the concentration of carbon monoxide included in the gaseous fuel supplied to the fuel-cells stack 40.

The fuel-cells stack 40 of this embodiment is a stack of Polymer Electrolyte Fuel Cells with platinum or a platinum-containing alloy carried thereon as the catalyst, as described previously. In this embodiment, the platinum catalyst is applied on the surface of the electrolyte membranes 41. In case that carbon monoxide is included in the gaseous fuel, the carbon monoxide is adsorbed by the platinum catalyst and lowers the catalytic function of platinum. This interferes with the reaction expressed as Equation (1) at the anode and thereby lowers the performance of the fuel cells. When the Polymer Electrolyte Fuel Cells like the fuel-cells stack 40 are used for generating electrical energy, it is accordingly essential to reduce the concentration of carbon monoxide included in the supply of gaseous fuel to a predetermined or lower level and thus prevent the performance of the fuel cells from being lowered. In the Polymer Electrolyte Fuel Cells, the allowable limit of carbon monoxide included in the supply of gaseous fuel is not greater than several ppm.

The gaseous fuel led to the CO reduction unit 26 is the hydrogen-rich gas containing a certain level of carbon monoxide as discussed above. The CO reduction unit 26 oxidizes carbon monoxide in preference to hydrogen in the gaseous fuel. The CO reduction unit 26 is filled with a carrier with a platinum-ruthenium alloy catalyst that works as a selective oxidizing catalyst of carbon monoxide. The final concentration of carbon monoxide included in the gaseous fuel after the treatment in the CO reduction unit 26 depends upon the operation temperature of the CO reduction unit 26, the concentration of carbon monoxide included in the gaseous fuel fed into the Co reduction unit 26, the flow of gaseous fuel per unit volume of the catalyst into the CO reduction unit 26, and other related parameters. The CO reduction unit 26 is provided with a carbon monoxide concentration sensor (not shown). The operation temperature of the CO reduction unit 26 and the flow of supplied gaseous fuel are regulated according to the result of measurement by the carbon monoxide concentration sensor, so that the final concentration of carbon monoxide included in the treated gaseous fuel is controlled to be not greater than several ppm.

The gaseous fuel treated by the CO reduction unit 26 to have the reduced concentration of carbon monoxide is led into the fuel-cells stack 40 via a fourth fuel supply conduit 81 and consumed by the cell reaction at the anodes. The fuel exhaust gas after the cell reaction in the fuel-cells stack 40 is discharged to the fuel exhaust conduit 74 and led into the burner 34, which consumes the remaining hydrogen included in the fuel exhaust gas as the fuel for combustion. The oxidizing gas involved in the cell reaction at the cathodes of the fuel-cells stack 40 is, on the other hand, supplied as the compressed air from the air tank 36 via a third air supply conduit 77. The oxidizing exhaust gas after the cell reaction in the fuel-cells stack 40 is discharged to the oxidizing exhaust gas conduit 73 and led into the compressor 32, so as to be compressed by the compressor element 32$b$ and recycled to the air tank 36.

The control unit 50 is constructed as a logic circuit including a microcomputer. Concretely the control unit 50 includes a CPU 54 for executing a variety of operations according to preset control programs, a ROM 56 in which control programs and control data required for the various operations by the CPU 54 are stored in advance, a RAM 58 from and into which a variety of data required for the various operations by the CPU 54 are temporarily read and written, and an input/output port 52 that receives detection signals from the temperature sensors and pressure sensors and outputs driving signals to the pumps and flow regulators based on the results of operations by the CPU 54.

Figure 3:
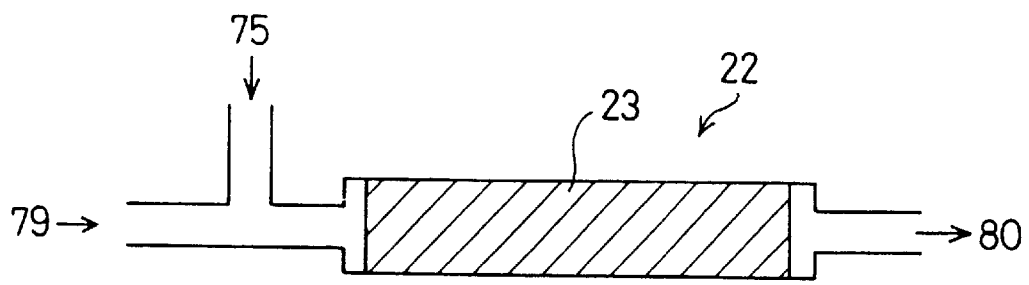
FIG. 3 schematically shows structure of a reformer 22 of the first embodiment.

The following describes the structure of the reformer 22, which is an essential part of the present invention. FIG. 3 schematically shows structure of the reformer 22 of the first embodiment. The reformer 22 has a reformer unit 23 filled with pellets of a Cu—Zn catalyst, which is a catalytic metal for accelerating the reforming reaction. The second fuel supply conduit 79, which sends the raw fuel gas including methanol and water vaporized in the evaporator 24 to the reformer 22, joins the first air supply conduit 75 before the joint with the reformer 22. The raw fuel gas including the vaporized methanol and water is accordingly mixed with the compressed air given as the oxidizing gas to contain a certain level of oxygen, before being fed into the reformer 22. The reformer unit 23 of the reformer 22 reforms the oxygen-containing raw fuel gas to a gaseous fuel. The gaseous fuel thus obtained is then supplied via the third fuel supply conduit 80 to the fuel-cells stack 40 and consumed by the cell reaction.

The pellets of the catalytic metal, that is, Cu—Zn catalyst, are particles of 3 to 7 mm in diameter obtained by preparing the catalytic metal through coprecipitation of copper and zinc oxide, adding a binder, such as alumina, to the catalytic metal, and extruding the mixture of the catalytic metal and the binder. The pellets used in this embodiment have the dimensions of approximately 3 mm×3 mm×3 mm. The pellets of the Cu—Zn catalyst are homogeneously packed into the reformer unit 23. The oxygen-containing raw fuel gas led into the reformer unit 23 comes into contact with the catalytic metal on the surface of the pellets to undergo the reforming reaction, while moving toward the outlet of the reformer 22 connecting with the third fuel supply conduit 80. The catalyst-containing pellets packed into the reformer unit 23 may be prepared by impregnation or any adequate process other than the coprecipitation.

The reforming reaction occurring in the reformer 22 is described in detail. Steam reforming of methanol in the presence of Cu—Zn catalyst generally follows the reactions defined by Equations (4) through (6) given above, and an endothermic reaction proceeds as a whole. In this embodiment, however, oxygen is further added to methanol and steam. In this case, an exothermic reforming reaction defined as Equation (7) given below proceeds in the presence of the Cu—Zn catalyst, in addition to the reforming reaction defined by Equations (4) through (6):

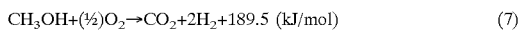
$$CH_3OH + (½)O_2 \rightarrow CO_2 + 2H_2 + 189.5 \text{ (kJ/mol)} \tag{7}$$

When the oxygen-containing raw fuel gas is supplied to the reformer 22 as shown in FIG. 3, the exothermic reaction defined by Equation (7) continues proceeding in the reformer 22 until oxygen is used up. While the exothermic reaction defined by Equation (7) proceeds, the general steam reforming reaction defined by Equation (6) is carried out. After oxygen has been consumed to stop the exothermic reaction defined by Equation (7), only the endothermic reforming reaction defined by Equation (6) proceeds. The amount of oxygen added to the raw fuel gas supplied to the reformer 22 should thus be determined according to the amount of methanol included in the raw fuel gas, in order to allow the amount of heat required for the general reforming reaction defined by Equation (6) to be supplied by the exothermic reaction defined by Equation (7). When the amount of oxygen included in the compressed air introduced into the reformer 22 is set equal to 10 to 20% of the amount of methanol fed into the reformer 22 by taking into account the possible energy loss due to the partial heat dissipation outside the high-temperature reformer 22, the amounts of heat absorbed and generated by the reactions balance with each other. Namely the amount of heat required for the endothermic reaction can be supplied by the amount of heat generated by the exothermic reaction.

Figure 4:
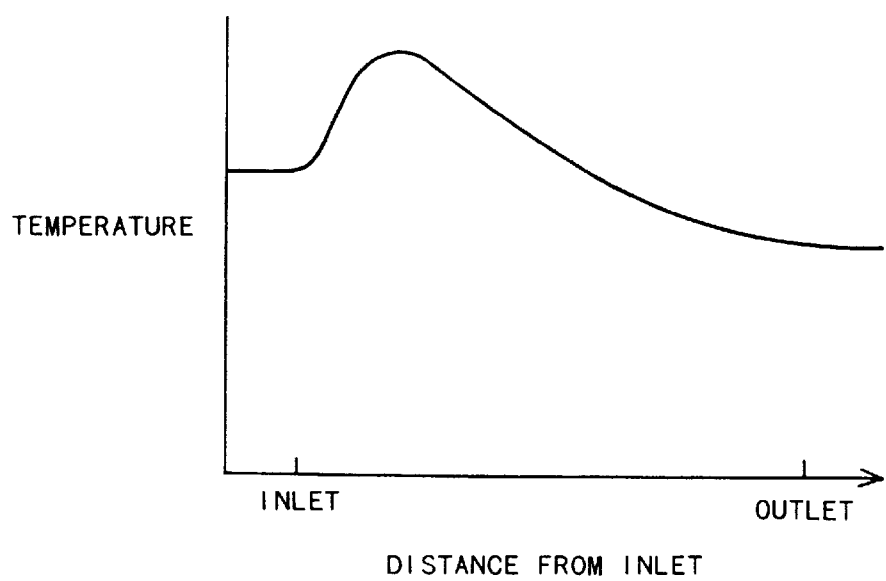
FIG. 4 is a graph showing a temperature distribution in the reformer 22.

FIG. 4 is a graph showing a temperature distribution in the reformer 22 when the oxygen-containing raw fuel gas is supplied to the reformer 22 and the endothermic and exothermic reforming reactions proceed as discussed above. In the vicinity of the inlet of the reformer 22, the endothermic reforming reaction defined by Equation (6) and the exothermic reaction defined by Equation (7) proceed simultaneously. The exothermic reaction generally has the higher reaction rate than that of the endothermic reaction, so that the amount of heat generated exceeds the amount of heat absorbed to increase the temperature in the reformer 22. Oxygen fed to the reformer 22 is used up some time after the temperature in the reformer 22 reaches a peak, and only the endothermic reaction defined by Equation (6) proceeds afterwards. The amount of heat required for the endothermic reaction is supplied by the heat generated by the exothermic reaction. After the temperature in the reformer 22 reaches its peak, the temperature thus gradually decreases toward the outlet of the reformer 22.

The reformer 22 of this embodiment discussed above can reduce the amount of heat supplied externally to the reformer 22. Since the mixture of the oxygen-containing compressed air and the raw fuel gas including the vaporized methanol and steam is fed into the reformer 22, the exothermic reforming reaction expressed as Equation (7) occurs in the reformer 22, in addition to the endothermic reforming reaction expressed as Equation (6). The reformer 22 includes the reformer unit 23 that is homogeneously filled with the Cu—Zn catalyst functioning as the reforming catalyst. The heat generated by the exothermic reaction of Equation (7) is diffused in the reformer unit 23 and thereby utilized as the heat required for the endothermic reaction of Equation (6). This structure can thus reduce the amount of heat supplied externally to the reformer 22 for the endothermic reaction.

In this embodiment, the amount of oxygen added to the raw fuel gas supplied to the reformer 22 is determined according to the amount of methanol included in the raw fuel gas, in order to allow the amount of heat required for the endothermic reaction to be supplied by the exothermic reaction. The structure of the embodiment does not accordingly require any additional heating device for supplying the heat required for the endothermic reaction. This effectively prevents the whole fuel cell system from being undesirably complicated or bulky. No extra energy is consumed for heating the reformer 22 in the structure of the embodiment, so that the energy efficiency of the whole fuel cell system is not lowered. As discussed previously, the amount of heat required for the endothermic reaction of Equation (6) proceeding in the reformer 22 is supplied by the exothermic reaction of Equation (7) proceeding in the reformer 22. Compared with the structure that supplies the heat from an external heat source arranged a predetermined distance apart, the structure of the embodiment has a smaller energy loss due to the heat dissipation and thereby prevents the energy efficiency of the whole system from being undesirably lowered.

In this embodiment, the oxygen-containing compressed air is added to the methanol-containing raw fuel gas at the inlet of the reformer 22. The peak of the temperature distribution in the reformer 22 is thus observed at the position closer to the inlet of the reformer 22. As discussed previously, after the temperature in the reformer 22 reaches the peak and the supply of oxygen is used up, only the endothermic reforming reaction expressed by Equation (6) proceeds. The temperature in the reformer 22 thus continues decreasing toward the outlet connecting with the third fuel supply conduit 80. In the reforming reaction, the lower temperature generally accelerates the shift reaction defined as Equation (5) given above and reduces the concentration of carbon monoxide. In this embodiment, the exothermic reaction that increases the temperature is vigorously carried out at the inlet of the reformer 22, whereas the temperature decreases at the outlet. The shift reaction is accordingly accelerated at the outlet of the reformer 22, so as to reduce the concentration of carbon monoxide included in the reformed fuel gas.

The reduced concentration of carbon monoxide included in the gaseous fuel decreases the quantity of carbon monoxide to be treated by the CO reduction unit 26. The required capacity of the CO reduction unit 26 can thus be lessened. In the structure that does not utilize the heat generated in the process of reducing carbon monoxide in the CO reduction unit 26 but discharges the heat out of the system, the decreased amount of carbon monoxide to be treated by the CO reduction unit 26 leads to a decrease in amount of heat not utilized but discharged, thus improving the energy efficiency of the whole system.

As discussed previously, when the amount of oxygen included in the compressed air introduced into the reformer 22 is set equal to 10 to 20% of the amount of methanol fed into the reformer 22, the amounts of heat absorbed and generated by the reactions balance with each other. Under such conditions, 20 to 40% of the amount of methanol supplied to the reformer 22 is used for the exothermic reaction expressed as Equation (7). Since the exothermic reaction is faster than the endothermic reaction, the rate of the reforming reaction occurring in the reformer 22 is heightened in case that the exothermic reaction of Equation (7) proceeds simultaneously with the endothermic reaction of Equation (6), compared with the case in which only the endothermic reaction of Equation (6) proceeds. In this embodiment, the exothermic reaction of Equation (7) is carried out with the certain ratio of raw fuel gas. This structure effectively reduces the volume of the reformer unit 23 required for generating a desired amount of gaseous fuel within a predetermined time period. The ratio of the amount of oxygen to the amount of methanol can be lessened by improving the heat insulation of the reformer 22 and reducing the possible energy loss of the reformer 22 due to the heat dissipation.

In the conventional structure that carries out only the reforming reaction defined by Equations (4) through (6), the amount of water (steam) two to three times as much as the amount of methanol is fed into the reformer. The excess amount of steam varies the equilibrium of the reaction expressed as Equation (5) to reduce the concentration of carbon monoxide, thereby accelerating the total reaction defined by Equation (6). Extra energy is, however, required to vaporize the excess amount of water, which leads to a decrease in energy efficiency of the whole system. In the structure of the embodiment, on the other hand, the reaction of Equation (7) which does not require water is carried out at the predetermined ratio, so that the amount of water supplied to the reformer 22 can be decreased. When 20 to 40% of methanol fed into the reformer 22 is consumed by the reaction of Equation (7), for example, the amount of water to be added is 1.2 to 2 times as much as the amount of methanol. This structure effectively decreases the amount of water vaporized in the evaporator 24 and reduces the amount of energy required for vaporizing water in the evaporator 24, thus improving the energy efficiency of the whole system. The structure of the embodiment further enables the evaporator 24, the water tank 30, and the piping system for connecting them with each other to be desirably space-saving and compact.

Another desirable structure of the embodiment has means for lowering the peak of the temperature distribution in the reformer 22 and maintaining the internal temperature of the reformer 22 within an appropriate range. As discussed above, the amount of oxygen fed into the reformer 22 can be determined according to the supply of methanol. In accordance with the desirable structure, the amount of oxygen fed into the reformer 22 is finely regulated, based on the state of the reforming reaction proceeding in the reformer 22. This enables the state of the temperature distribution in the reformer 22 to be kept in a favorable range. A concrete structure for regulating the supply of oxygen, for example, includes a fourth temperature sensor 31 disposed in the reformer 22. The control unit 50 receives a detection signal from the fourth temperature sensor 31 and outputs a driving signal to the first flow regulator 66 based on the input data. In case that the internal temperature of the reformer 22 rises with an increase in supply of oxygen, this structure enables the control unit 50 to immediately control the first flow regulator 66, in order to reduce the amount of oxygen and maintain the temperature in the reformer 22 within a suitable range.

This desirable structure of regulating the supply of oxygen according to the state of the temperature distribution in the reformer 22 can effectively prevent the internal temperature of the reformer 22 from temporarily or partially rising too high and causing various problems. The major problems caused by the unintentional increase in internal temperature of the reformer 22 include deterioration of the catalyst and generation of non-required by-products.

The first drawback is deterioration of the catalyst. The reformer unit 23 of the reformer 22 is filled with the Cu—Zn catalyst as described above. In case that the Cu—Zn catalyst is exposed to the temperatures of about 300° C. or higher, there is a possibility of lowering its durability and sintering the Cu—Zn catalyst to deteriorate its catalytic effect. The term 'sintering' herein implies the phenomenon of aggregating the catalyst carried on the surface of the carrier. In the normal state of the Cu—Zn catalyst, fine particles of copper are dispersed on the surface of zinc particles. Sintering, however, agglomerates the fine particles of copper to large particles on the surface of the carrier. This phenomenon decreases the surface area of the copper particles and reduces the active area of the catalyst, thereby lowering the performance of the reformer 22.

The second drawback is generation of by-products. At the predetermined high temperatures, while the normal reforming reactions proceed, undesirable side reactions are carried out to generate, for example, methane or nitrogen oxides (the latter is generated by a reaction of nitrogen gas included in the pressurized air). These by-products are not decomposed in the temperature range of the normal reforming reactions occurring in the reformer 22 and are accordingly fed to the fuel-cells stack 40. Especially an increase in methane undesirably leads to a decrease in hydrogen partial pressure in the gaseous fuel. The desirable structure of this embodiment can prevent these drawbacks.

In the above structure, the control unit 50 receives a detection signal representing the internal temperature of the reformer 22 and controls the supply of oxygen based on the input data. Another available structure regulates the supply of oxygen without the operation of the control unit 50. In this available structure, the first flow regulator 66 is composed of a bimetal or shape-memory alloy and disposed at a site that adjoins to the reformer 22 and reflects the internal temperature of the reformer 22. This structure enables the first flow regulator 66 to directly detect the temperature in the reformer 22 and regulate the amount of the compressed air supplied to the reformer 22. The structure of controlling the amount of oxygen fed into the reformer 22 according to the internal temperature of the reformer 22 enables the inside of the reformer 22 to be kept in the desirable temperature range of 250 to 300° C., and effectively prevents the drawbacks discussed above, that is, deterioration of the catalyst and generation of by-products.

In the above embodiment, the first air supply conduit 75 joins the second fuel supply conduit 79 immediately before the reformer unit 23 of the reformer 22, in order to add the compressed air to the raw fuel gas containing methanol. As long as the raw fuel gas containing oxygen can reach the reforming catalyst, however, the compressed air may be added at any desirable position. By way of example, the first air supply conduit 75 with the first flow regulator 66 may join the first fuel supply conduit 78, in order to mix oxygen with the raw fuel gas prior to the evaporator 24.

Alternatively, the first air supply conduit 75 with the first flow regulator 66 may be connected directly with the reformer 22, instead of joining the second fuel supply conduit 79 as shown in FIG. 3, so as to introduce the compressed air alone into the reformer unit 23. The inlet of the compressed air into the reformer unit 23 may be close to or a certain distance apart from the inlet of the raw fuel gas. In this alternative structure, the peak of the temperature increase by the exothermic reaction of Equation (7) is shifted toward the outlet of the reformer 22. A sufficient increase in temperature of the raw fuel gas supplied to the reformer 22 enables the endothermic reforming reaction to proceed at the inlet of the reformer 22. Means for supplementing the heat required for the reforming reaction may be disposed in the vicinity of the inlet of the reformer 22. In order to reduce the concentration of carbon monoxide included in the gaseous fuel, it is desirable to arrange the inlet of the compressed air at an adequate position to allow a sufficient decrease in temperature at the outlet of the reformer 22.

The reforming catalyst used in the reformer 22 of this embodiment is the Cu—Zn catalyst, which accelerates both the steam reforming reaction defined by Equations (4) through (6) and the exothermic reforming reaction expressed as Equation (7). This single catalyst realizes the above functions required for the reformer unit 23 and thereby simplifies the structure of the reformer unit 23. The catalyst packed into the reformer unit 23 may, however, be any other catalyst that can accelerate both the steam reforming reaction and the exothermic reforming reaction, for example, a Pd—Zn catalyst.

In the reformer 22 of this embodiment, the reformer unit 23 is filled with the pellets of the Cu—Zn catalyst. The reformer unit 23 may alternatively have a honeycomb structure. In this case, the catalytic metal is carried on the surface of the honeycomb structure of the reformer unit 23.

Figure 5:
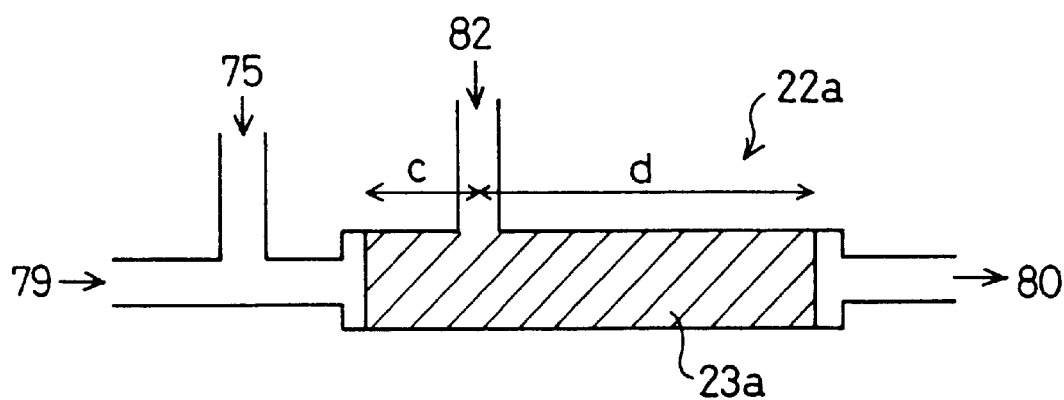

In the first embodiment, the required amount of oxygen is all added in advance to the methanol-containing raw fuel gas prior to the supply into the reformer 22. Another desirable structure given as a second embodiment adds a certain amount of oxygen in the course of the reactions occurring in the reformer 22. FIG. 5 shows structure of a reformer 22a incorporated in a fuel cell system according to the second embodiment. The fuel cell system of the second embodiment has the same constituents as those of the fuel cell system 20 of the first embodiment shown in FIG. 1, except the reformer 22a. The like elements are accordingly not described here and are shown by the like numerals. Reformers of third through sixth embodiments described after the second embodiment are respectively incorporated in the fuel cell system having the same structure as that of the fuel cell system 20 of the first embodiment.

Like the reformer 22 of the first embodiment shown in FIG. 3, in the structure of the second embodiment, the second fuel supply conduit 79 for supplying the raw fuel gas including vaporized methanol and steam to the reformer 22a joins the first air supply conduit 75 prior to the joint with the reformer 22a. The raw fuel gas including vaporized methanol and water is mixed with the compressed air to contain a certain amount of oxygen, before being fed into the reformer 22a. An air supply branch path 82 is connected to the reformer 22a of the second embodiment at a position closer to the inlet of the reformer 22a, in order to supply an additional amount of the compressed air to the reformer 22a. The air supply branch path 82 is branched from the first air supply conduit 75 and receives the compressed air from the air tank 36.

Like the reformer 22 of the first embodiment, a reformer unit 23a of the reformer 22a is filled with pellets of the Cu—Zn catalyst functioning as the reforming catalyst. In the same manner as the first embodiment, the gaseous fuel generated by the reformer 22a is supplied to the fuel-cells stack 40 via the third fuel supply conduit 80.

Figure 6:
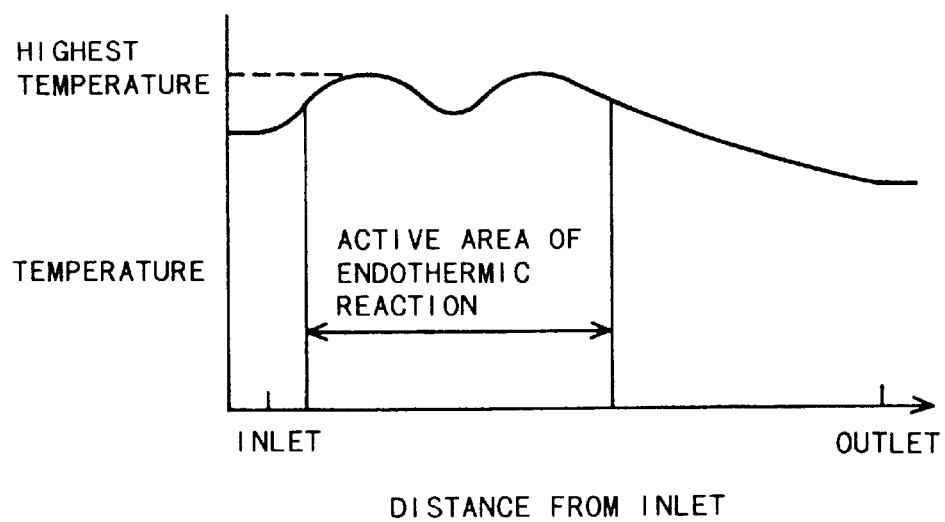

FIG. 6 is a graph showing a temperature distribution in the reformer 22a when the reforming reactions proceed, upon condition that the oxygen-containing raw fuel gas is supplied to the inlet of the reformer 22 and the compressed air is further added to the middle of the reformer 22a. The amount of oxygen added to the middle of the reformer 22a is identical with that added to the inlet of the reformer 22a. Like the first embodiment, the exothermic reaction expressed as Equation (7) proceeds in the vicinity of the inlet of the reformer 22a. This exothermic reaction raises the temperature in the reformer 22a and accelerates the endothermic reaction expressed as Equation (6). Since the exothermic reaction is faster than the endothermic reaction as discussed above, the internal temperature of the reformer 22a continues increasing.

Oxygen introduced with the raw fuel gas is used up to conclude the exothermic reaction of Equation (7) some time after the internal temperature of the reformer 22a reaches a peak. Only the endothermic reaction expressed as Equation (6) continues proceeding afterwards by utilizing the heat generated by the exothermic reaction of Equation (7), so as to lower the internal temperature of the reformer 22a, in the same manner as the first embodiment. In the structure of the second embodiment, however, the additional amount of the compressed air is supplied through the air supply branch path 82. The additional supply of the compressed air initiates the exothermic reaction of Equation (7) and raises the internal temperature of the reformer 22a again. After the additional supply of oxygen is used up, only the endothermic reaction of Equation (6) proceeds in the reformer 22a and the temperature thus gradually decreases toward the outlet of the reformer 22a.

The structure of the second embodiment feeds the oxygen-containing compressed air to the reformer 22a at two different times. This leads to two separate peaks of the exothermic reaction of Equation (7) among the reforming reactions occurring in the reformer 22a. While the total amount of oxygen supplied to the reformer 22a is identical with that of the first embodiment, the structure of the second embodiment can lower the peak of the temperature distribution in the reformer 22a. The lowered peak temperature in the reformer 22a effectively prevents the catalyst from being sintered and deteriorating its catalytic effect, due to a partial or temporary extreme increase in temperature in the reformer 22a. The lowered peak temperature in the reformer 22a also decreases the possible energy loss due to heat dissipation, which is ascribed to the temperature difference between the inside of the reformer 22a and the surrounding air. The smaller energy loss due to heat dissipation enables the greater amount of heat generated by the exothermic reaction to be used for the endothermic reaction, thereby enabling a further reduction in size of the reformer 22a and improving the energy efficiency of the whole system.

It is preferable that the additional supply of the oxygen-containing air is given to the reformer 22a at a position closer to its inlet, or more specifically at a position defined by d/c of 1 to 4 in the drawing of FIG. 5. This structure gives two separate peaks of the exothermic reaction to exert the effects discussed above, and enables the internal temperature to be sufficiently lowered in the vicinity of the outlet of the reformer 22a. The sufficiently low temperature accelerates the shift reaction of Equation (5) at the outlet of the reformer 22a and thus significantly lowers the concentration of carbon monoxide included in the gaseous fuel fed through the third fuel supply conduit 80.

In the structure of the second embodiment, the two separate peaks of the exothermic reaction widen the area having temperatures equal to or higher than a predetermined level in the reformer 22a, thus increasing the active area of the endothermic reaction. The endothermic reaction is accelerated sufficiently when the surrounding temperature is raised to a predetermined or higher level. On the assumption that the total amount of heat generated by the exothermic reaction is fixed, even if the peak temperature of the exothermic reaction is low, the wider area having temperatures equal to or higher than a predetermined level increases the efficiency of the endothermic reaction as a whole. The increase in active area of the endothermic reaction improves the reforming efficiency per unit volume in the reformer 22a, thereby enabling a further reduction in size of the reformer 22a.

In the second embodiment, two equal portions of the air are supplied to the reformer 22a separately. The supply of the air may, however, be divided at a variable ratio, in order to regulate the temperature distribution in the reformer 22a. This alternative structure is readily realized by arranging regulating valves, which are controllable by the control unit 50, in the first air supply conduit 75 and the air supply branch path 82. Even when the amount processed by the reforming reaction in the reformer 22a is varied with a variation in amount of electrical energy generated by the fuel-cells stack 40, the structure of controlling the divisions of oxygen supply can adjust the peak temperature in the reformer 22a and the active area of the endothermic reaction. The regulation of the oxygen supplies from predetermined positions based on the amount of methanol included in the raw fuel gas fed into the reformer 22a adequately controls the temperature distribution in the reformer 22a and regulates the concentration of carbon monoxide in the gaseous fuel generated by the reforming reaction within an appropriate range. This structure enables the amount processed by the reforming reaction in the reformer 22a to be regulated according to the output state of the fuel-cells stack 40 without delay, thereby facilitating the regulation of the gas flow supplied to the fuel-cells stack 40.

When the supply of oxygen to the reformer 22a is controlled by the regulating valves arranged in the first air supply conduit 75 and the air supply branch path 82 as discussed above, sensors should be disposed at the related portions of the fuel cell system. The control unit 50 receives detection signals from these sensors and controls the regulating valves based on the input information. This enables the supply of oxygen to be regulated with high accuracy. By way of example, the reformer 22a is provided with a temperature sensor for measuring the temperature in the reformer 22a. In case that the peak temperature of the reforming reactions rises too high, the supply of oxygen through either or both of the two regulating valves is decreased to discourage the exothermic reforming reaction and lower the temperature. In case that the temperature in the reformer 22a starts decreasing, on the contrary, the supply of oxygen is increased to encourage the exothermic reforming reaction.

As another example, a CO sensor for measuring the concentration of carbon monoxide included in the gaseous fuel generated by the reforming reaction is arranged in the third fuel supply conduit 80. This structure enables a variation in concentration of carbon monoxide included in the reformed gas to be monitored. When the concentration of carbon monoxide becomes equal to or greater than a predetermined level, the supply of the air through the air supply branch path 82 is decreased to lower the temperature in the vicinity of the outlet of the reformer 22a and reduce the concentration of carbon monoxide included in the gaseous fuel. As still another example, a flow sensor for measuring the flow of the raw fuel gas supplied to the reformer 22a is arranged in the second fuel supply conduit 79. This structure enables the supply of oxygen to be regulated to an appropriate level, in response to a variation in amount of the gas to be reformed by the reformer 22a.

Figure 7:
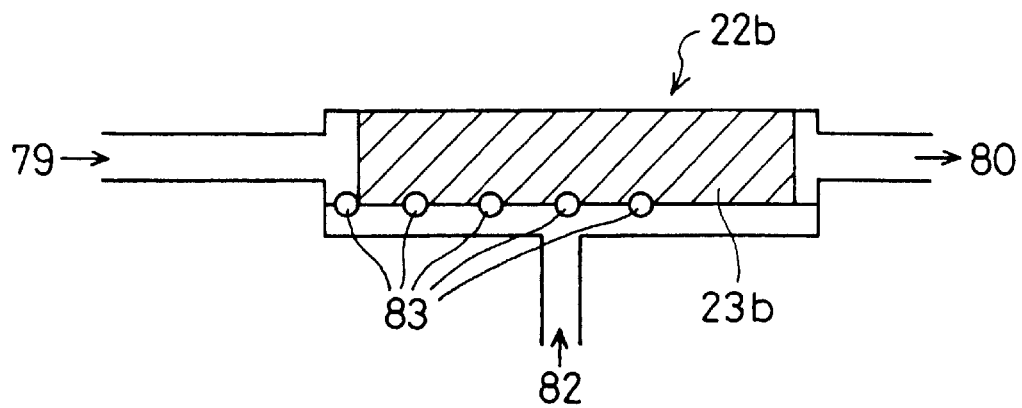
FIG. 7 schematically shows structure of still another reformer 22b.

In the second embodiment discussed above, the oxygen-containing compressed air can be supplied from two different positions into the reformer 22a. Another desirable structure given as a modification has three or more different positions, from which the compressed air is supplied. FIG. 7 shows structure of a reformer 22b having three or more air-supply positions (five air-supply positions in the drawing). In the second embodiment shown in FIG. 5, the compressed air flowing through the air supply branch path 82 is subjected directly to the reforming reactions occurring in the reformer 22a. In the modified structure shown in FIG. 7, on the other hand, the compressed air flowing through the air supply branch path 82 is fed into a reformer unit 23b via a plurality of regulating apertures 83 formed inside the reformer 22b. The reformer unit 23b is filled with pellets of the Cu—Zn catalyst in the same manner as the first and the second embodiments.

This structure of feeding divisions of the compressed air from a plurality of different positions decreases the amount of the air to be supplied from each position, thus further lowering the peak of the temperature increase by the exothermic reforming reaction. The increase in number of the air-supply positions further widens the area having temperatures equal to or higher than a predetermined level in the reformer 22b and thereby increases the active area of the endothermic reaction. It is preferable that the position of the last regulating aperture 83 is a predetermined distance apart from the outlet of the reformer 22b connecting with the third fuel supply conduit 80. The predetermined distance enables the internal temperature of the reformer 22b to be sufficiently lowered in the vicinity of the outlet, thus accelerating the shift reaction of Equation (5) and sufficiently reducing the concentration of carbon monoxide included in the reformed fuel gas.

When the plurality of regulating apertures 83 have an identical diameter, the compressed air flowing through the air supply branch path 82 is fed into the reformer 22b equally from the respective regulating apertures 83. This uniformly disperses the temperature increase in the reformer 22b. In accordance with another desirable structure, the diameter of the regulating apertures 83 in the rear portion is made smaller than that of the regulating apertures 83 in the front portion. This decreases the amount of the air supplied to the rear portion of the reformer 22b and lowers the peak of the temperature increase in the rear portion, thereby lowering the temperature in the vicinity of the outlet of the reformer 22b and reducing the concentration of carbon monoxide.

The regulating apertures 83 may be constructed as regulating valves driven by the control unit 50. This structure allows the supply of the air to be finely controlled according to the various conditions surrounding the reformer 22b. By way of example, the control unit 50 receives a detection signal from a temperature sensor, which measures the temperature distribution in the reformer 22b, and controls the open and close conditions of the respective regulating apertures 83 based on the input data of temperature distribution to vary the supply of the air through the respective regulating apertures 83, thus keeping the temperature distribution in the reformer 22b in a desired state with high accuracy. In accordance with another desirable structure, the control unit 50 also receives detection signals from various sensors for measuring the concentration of carbon monoxide included in the gaseous fuel flowing into the third fuel supply conduit 80 and the flow of the raw fuel gas supplied through the second fuel supply conduit 79, other than the internal temperature of the reformer 22b, and finely controls the open and close conditions of the respective regulating apertures 83 based on the input data, thereby maintaining the high reforming efficiency in the reformer 22b.

The regulating apertures 83 may alternatively be composed of a bimetal or shape-memory alloy. The open and close conditions of the respective regulating apertures 83 are then varied with a temperature change in the surrounding areas of the regulating apertures 83. This structure regulates the supply of the air and enables the temperature distribution in the reformer 22b to be kept in a desired range. Compared with the above structure of the regulating apertures 83 controlled by the control unit 50, the elements and wiring can be remarkably simplified in this alternative structure.

Figure 8:
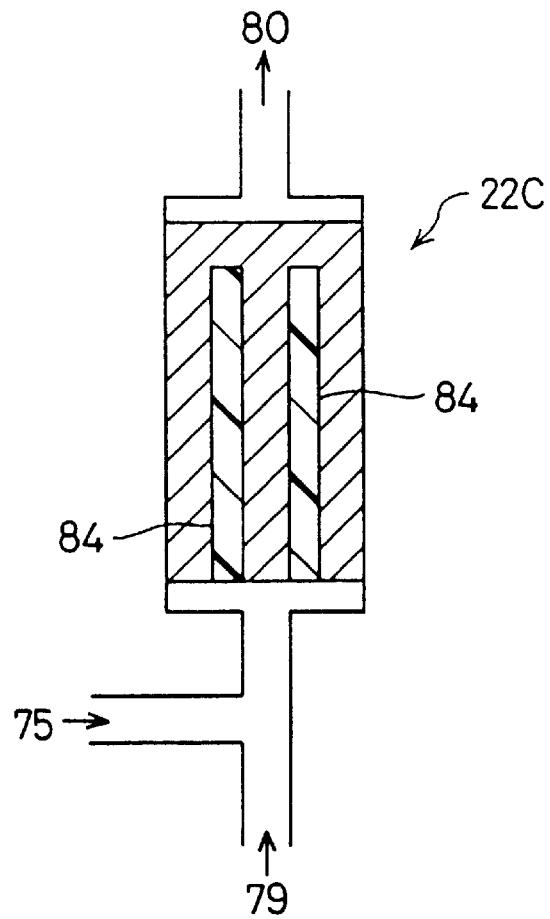
FIG. 8 schematically shows structure of another reformer 22c.

In the second embodiment discussed above, the temperature in the reformer is controlled by regulating the supply of the air used for the reforming reaction. Another preferable structure described as a third embodiment has heat transmission means disposed in the reformer for regulating the reaction temperature. FIG. 8 shows structure of another reformer 22c having heat pipes 84 incorporated therein. Like the reformer 22 of the first embodiment shown in FIG. 3, in the structure of the third embodiment, the second fuel supply conduit 79 joins the first air supply conduit 75 in the vicinity of the inlet of the reformer 22c. The methanol-containing raw fuel gas is mixed with oxygen, before being fed into the reformer 22c. The reformer 22c is filled with pellets of the Cu—Zn catalyst, in the same manner as the first and the second embodiments. The heat generated by the exothermic reforming reaction is transmitted in the reformer 22c via the heat pipes 84 arranged inside the reformer 22c.

Figure 9:
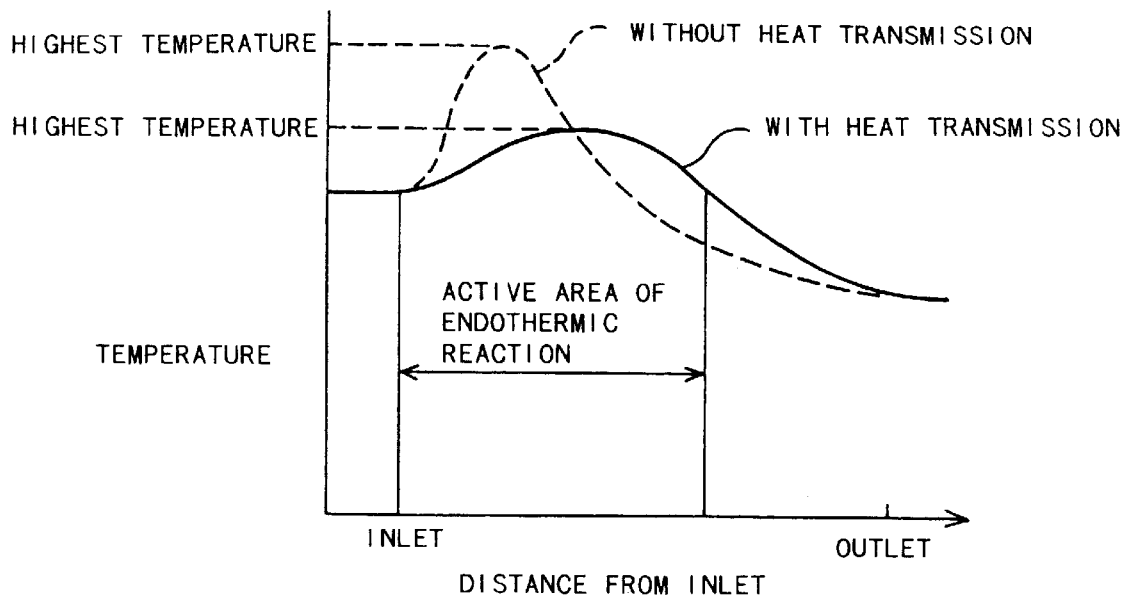
FIG. 9 is a graph showing a temperature distribution in the reformer 22c.

FIG. 9 is a graph showing a temperature distribution in the reformer 22c when the reforming reactions proceed in the reformer 22c. The raw fuel gas fed into the reformer 22c undergoes the reforming reactions, while moving toward the outlet of the reformer 22c. Since the raw fuel gas contains a large quantity of oxygen at the inlet of the reformer 22c, the exothermic reforming reaction defined by Equation (7) vigorously proceeds in the vicinity of the inlet. Because of the heat generated by the exothermic reaction, the temperature in the reformer 22c continues increasing and reaches a peak. The heat pipes 84 disposed in the reformer 22c transmit the heat generated by the exothermic reaction to the rear portion of the reformer 22c. The peak temperature in the reformer 22c with the heat pipes 84 for heat transmission is accordingly lower than the same in the reformer without any heat pipes. This structure effectively prevents the internal temperature of the reformer 22c from temporarily or partially rising too high, thereby being free from the drawbacks discussed above, such as deterioration of the catalyst.

The heat pipes 84 transmit the heat from the high-temperature area to the low-temperature area. In the reformer 22c of the third embodiment, while the peak temperature is lowered, the temperature level other than the peak is totally heightened. This widens the area having temperatures equal to or greater than a predetermined level and increases the active area of the endothermic reforming reaction defined by Equation (6), thereby improving the efficiency of the reforming reaction per unit volume in the reformer 22c. The reformer 22c of the third embodiment does not require any complicated mechanism for controlling the supply of the air, but exerts the effects discussed above with the heat pipes disposed therein.

In the structure of the third embodiment, the heat generated by the exothermic reaction is dispersed inside the reformer 22c. This lowers the peak of the temperature increase by the exothermic reaction and thus enables a greater quantity of oxygen to be supplied at one time in order to accelerate the exothermic reaction. This characteristic is especially advantageous when the load abruptly increases, for example, at the time of starting the system, as discussed below.

When an abrupt increase in amount of the raw fuel gas treated by the reforming reaction is required, for example, at the time of starting the fuel cell system, it is desirable to heighten the ratio of the exothermic reaction that has the higher reaction rate than that of the endothermic reaction, in order to reform the required amount of the raw fuel gas within a shorter time period. In case that the excess amount of oxygen is supplied at one time to enhance the ratio of the exothermic reaction, however, the peak temperature rises too high and the problems, such as deterioration of the catalyst, arise. Even when the supply of oxygen is increased temporarily to enhance the ratio of the exothermic reaction, for example, at the time of starting the system, the structure of the third embodiment effectively prevents the internal temperature of the reformer 22c from locally rising too high. This structure accordingly enables the exothermic reforming reaction to be accelerated and generate the required amount of gaseous fuel within a short time period. In the general state, the supply of oxygen is 10 to 20% of the amount of methanol applied for the reforming reaction, and the exothermic reaction expressed as Equation (7) proceeds with 20 to 40% of the total amount of methanol. In the reformer 22c, on the other hand, the supply of oxygen is 12.5 to 30% of the amount of methanol, and the exothermic reaction proceeds with 25 to 60% of the total amount of methanol.

The reformer 22c with the heat pipes 84 incorporated therein for transmitting the heat inside the reformer 22c accelerates the endothermic reforming reaction as well as the exothermic reaction having the higher reaction rate. While lowering the peak temperature, the reformer 22c expands the active area of the endothermic reaction having temperatures equal to or higher than a predetermined level as shown in FIG. 9. The acceleration of the endothermic reaction defined by Equation (6) increases the processed amount by the reformer 22c, thus improving the reforming efficiency per unit volume.

The dispersion of the heat by the heat transmission as shown in the third embodiment not only decreases the peak temperature to prevent deterioration of the catalyst but interferes with generation of the undesired by-products in the process of the reforming reaction. As discussed previously, in case that the temperature rises too high, for example, 400° C. or higher, even temporarily or partially in the reformer 22c, methane and nitrogen oxides may be generated. A temporary or partial decrease in temperature to or below a predetermined level may also cause some by-products, such as formic acid, methyl formate, and formaldehyde. These by-products are decomposed with a subsequent increase in temperature to hydrogen and carbon dioxide. The by-products generated at high temperatures are, on the contrary, not decomposed once being generated. The reformer 22c of this embodiment with the heat pipes 84 for dispersing the heat and averaging the internal temperature of the reformer 22c effectively prevents such by-products from being generated with an extreme increase in reaction temperature.

In case that the heat dispersion transmits the heat to the outlet of the reformer 22c, an increase in temperature at the outlet undesirably raises the concentration of carbon monoxide included in the reformed fuel gas. The shift reaction expressed as Equation (5) does not sufficiently proceed and the concentration of carbon monoxide included in the reformed fuel gas is heightened, unless the temperature at the outlet of the reformer 22c decreases to or below a predetermined level. In the reformer 22c of the third embodiment, the heat pipes 84 do not extend to the outlet of the reformer 22c. This structure prevents the heat from being transmitted to the outlet of reformer 22c, and the endothermic reforming reaction thus vigorously proceeds to lower the temperature in the vicinity of the outlet of the reformer 22c. The sufficiently low temperature at the outlet of the reformer 22c accelerates the shift reaction expressed as Equation (5) and reduces the concentration of carbon monoxide included in the gaseous fuel.

Figure 10:
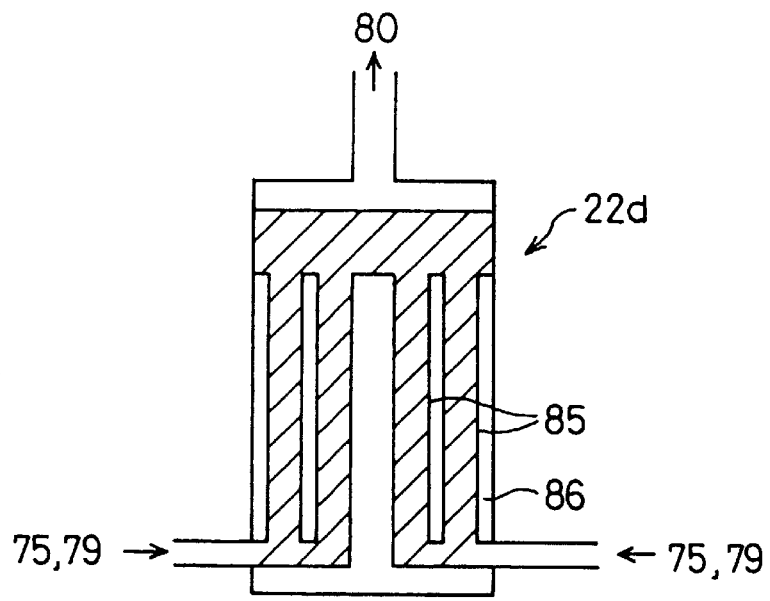
FIG. 10 schematically shows structure of another reformer 22d.

FIG. 10 shows structure of still another reformer 22d which is given as a modification of the reformer 22c of the third embodiment. Whereas the reformer 22c has the heat pipes 84 disposed therein for heat transmission, the container of the reformer 22d functions as means of heat transmission in this modified structure. A plurality of reforming pipes 85 are arranged inside a stainless-steel heat conductive unit 86. Each reforming pipe 85 is filled with pellets of the Cu—Zn catalyst. The first air supply conduit 75 and the second fuel supply conduit 79 meet each other to add oxygen to the raw fuel gas. The reforming pipes 85 receive a supply of the oxygen-containing raw fuel gas and reform the raw fuel gas to a hydrogen-rich gaseous fuel. The heat generated by the oxygen-consuming, reforming reaction of Equation (7) proceeding in the reformer 22d is transmitted to lower-temperature areas in the reformer 22d via the heat conductive unit 86, which is the container of the reformer 22d.

In a similar manner as in the reformer 22c, the heat generated by the exothermic reaction is transmitted to the surrounding lower-temperature areas in the reformer 22d. This leads to a decrease in peak temperature and thereby prevents drawbacks, such as deterioration of the catalyst. This structure is especially advantageous when a larger amount of oxygen is supplied to heighten the ratio of the exothermic reforming reaction with a view to abruptly increasing the amount of gaseous fuel generated through the reforming reaction, for example, at the time of starting the fuel cell system. Like the structure of the reformer 22c, this modified structure enables the heat generated by the exothermic reaction to be dispersed inside the reformer 22d, thus expanding the active area of the endothermic reaction and preventing the non-required by-products from being generated by an extreme increase or decreased in temperature in the process of the reforming reaction.

As shown in FIG. 10, the heat conductive unit 86 is not arranged in the vicinity of the outlet of the reformer 22d connecting with the third fuel supply conduit 80. Like the structure of the reformer 22c, this structure prevents the heat from being transmitted to the outlet of the reformer 22d, and the endothermic reforming reaction thus vigorously proceeds to lower the temperature in the vicinity of the outlet of the reformer 22d. The sufficiently low temperature at the outlet of the reformer 22c accelerates the shift reaction expressed as Equation (5) and reduces the concentration of carbon monoxide included in the gaseous fuel.

In both the reformers 22c and 22d, the heat is not transmitted to the outlet connecting with the third fuel supply conduit 80, in order to reduce the concentration of carbon monoxide included in the resulting gaseous fuel. As discussed previously, the gaseous fuel is transported via the third fuel supply conduit 80 to the CO reduction unit 26, which further reduces the concentration of carbon monoxide. As long as the CO reduction unit 26 has the capacity of sufficiently lowering the concentration of carbon monoxide, the reformers 22c and 22d may have the structure of transmitting the heat generated by the exothermic reaction to the outlet and not specifically accelerating the shift reaction of Equation (5).

Figure 11:
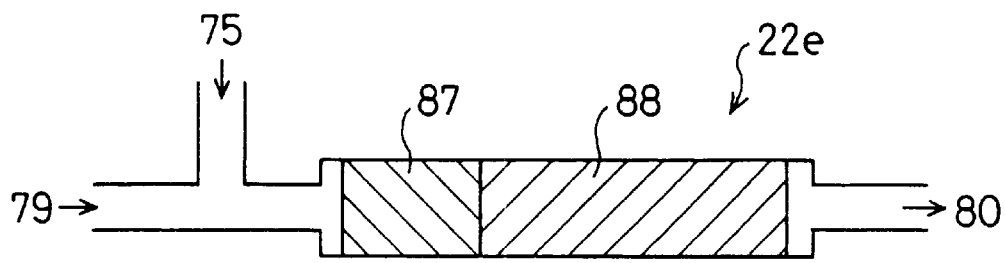
FIG. 11 schematically shows structure of still another reformer 22e.
Figure 21:
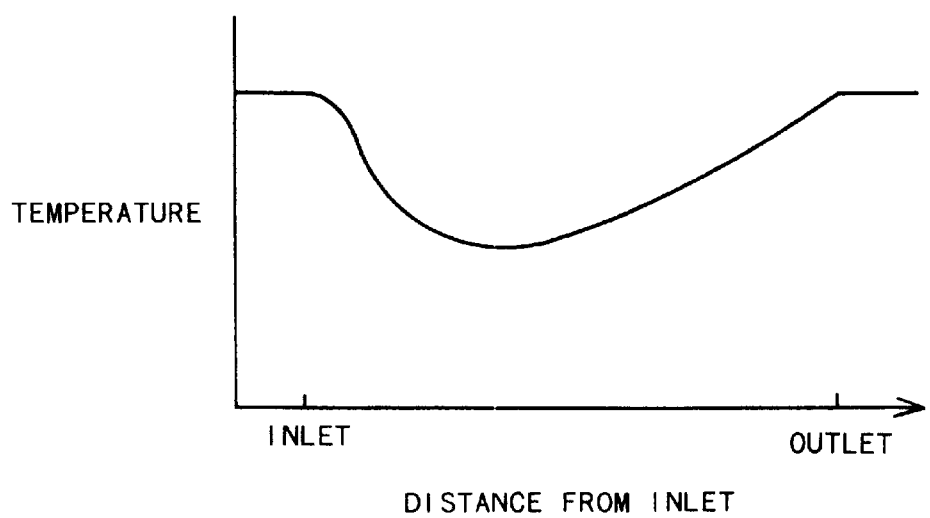
FIG. 21 is a graph showing a temperature distribution in a conventional reformer with a heater.

As described above, the peak of the temperature increase by the exothermic reaction is lowered to prevent deterioration of the catalyst by regulating the supply of oxygen in the reformer 22 of the first embodiment, by dividing the supply of the air required for the exothermic reaction in the reformers 22a and 22b of the second embodiment, and by transmitting the heat in the reformers 22c and 22d of the third embodiment. In still another reformer 22e given below as a fourth embodiment according to the present invention, a catalyst with excellent heat resistance is used to accelerate the exothermic reaction and thereby prevent deterioration of the catalyst. FIG. 11 shows structure of the reformer 22e of the fourth embodiment.

The reformer 22e includes a first catalyst layer 87 filled with pellets of a palladium catalyst having excellent heat resistance and a second catalyst layer 88 filled with pellets of the Cu—Zn catalyst discussed above. The first air supply conduit 75 joins the second fuel supply conduit 79 to add oxygen to the raw fuel gas. The oxygen-containing raw fuel gas first flows through the first catalyst layer 87 for the reforming reaction. The palladium catalyst held on the carrier packed in the first catalyst layer 87 does not deteriorate at high temperatures as 500° C. and has better heat resistance than the Cu—Zn catalyst. With a supply of the raw fuel gas containing methanol and oxygen, the palladium catalyst accelerates the oxidizing reforming reaction of methanol expressed as Equation (7) and the decomposition of methanol expressed as Equation (4). The palladium pellets packed into the first catalyst layer 87 are prepared by impregnating zinc oxide with palladium nitrate in this embodiment, although any other suitable method may be adopted.

Compared with the Cu—Zn catalyst, the palladium catalyst more vigorously accelerates the exothermic reaction of Equation (7) and thereby leads to generation of a greater amount of heat. While the endothermic reaction expressed as Equation (4) is carried out simultaneously, the internal temperature of the reformer 22e continues increasing since the heat consumed by the endothermic reaction of Equation (4) is less than the heat generated by the exothermic reaction of Equation (7). The increase in internal temperature of the reformer 22e further accelerates the endothermic reaction of Equation (4). Decomposition of methanol included in the raw fuel gas accordingly proceeds in the reformer 22e with the increase in temperature.

After the decomposition of methanol through the reactions of Equations (4) and (7) in the first catalyst layer 87, the raw fuel gas is moved into the second catalyst layer 88, in which the reactions expressed as Equations (5) and (6) proceed. The heat generated by the exothermic reaction of Equation (7) proceeding in the first catalyst layer 87 is utilized for the endothermic reaction of Equation (6). In the second catalyst layer 88, the temperature thus gradually decreases toward the outlet of the reformer 22e. When the internal temperature of the second catalyst layer 88 decreases to a predetermined or lower level, the exothermic shift reaction of Equation (5) is accelerated to reduce the concentration of carbon monoxide including in the gaseous fuel generated by the reforming reaction.

The reformer 22e of the fourth embodiment has the first catalyst layer 87 that is composed of the carrier with the high-heat-resistant palladium catalyst held thereon. Even if the exothermic reaction of Equation (7) abruptly increases the temperature in the first catalyst layer 87, the palladium catalyst exposed to the high temperatures does not deteriorate significantly. This enables a larger amount of oxygen to be supplied to the first catalyst layer 87 and accelerate the exothermic reaction of Equation (7). The acceleration of the exothermic reaction of Equation (7) generates the greater amount of heat and thereby accelerates the endothermic reaction of Equation (4) occurring simultaneously. This improves the reforming efficiency per unit volume in the reformer 22e. The improvement in reforming efficiency realizes the efficient reforming reaction in a smaller volume, thus enabling reduction in size of the reformer 22e. When the processed amount by the reforming reaction is to be abruptly increased, for example, at the time of starting the system with the reformer 22e incorporated therein, the structure of the fourth embodiment allows for the increased supply of oxygen in order to increase the amount of gaseous fuel thus generated.

The second catalyst layer 88 is filled with the Cu—Zn catalyst having the poorer heat resistance than the palladium catalyst. Since the endothermic reaction occurs primarily in the second catalyst layer 88, the temperature decreases toward the outlet of the reformer 22e. The second catalyst layer 88 is accordingly free from deterioration of the catalyst due to an extreme increase in temperature. The Cu—Zn catalyst has the activity of accelerating the shift reaction expressed as Equation (5). In the vicinity of the outlet of the catalyst 22e with the lowered temperature, oxidation of carbon monoxide proceeds to reduce the concentration of carbon monoxide included in the resulting gaseous fuel.

Although the first catalyst layer 87 in the reformer 22e of the fourth embodiment is filled with the palladium catalyst, any other catalyst that has a certain heat resistance and can accelerate the oxidation reaction of methanol defined by Equation (7) may be applicable for the first catalyst layer 87. The available examples other than the palladium catalyst include metals, such as platinum, nickel, rhodium, chromium, tungsten, rhenium, gold, silver, and iron, and alloys of such metals and other metals.

As discussed previously, in the fuel cell systems of the first through the fourth embodiments, each reformer adopts a specific structure to prevent the heat generated by the oxidation reaction of methanol included in the raw fuel gas from raising the temperature of the catalyst in the reformer too high and thereby causing problems like sintering of the reforming catalyst. One of the adopted structures monitors the temperature of the catalyst and decreases the supply of oxygen with an extreme increase in temperature to interfere with the exothermic reaction. Another adopted structure has a plurality of oxygen-supply positions or a mechanism for heat transfer to disperse the heat generated by the oxidation reaction in the reformer. Still another adopted structure utilizes the high-heat-resistant oxidation catalyst to prevent its deterioration with an increase in temperature. An extreme increase in temperature of the catalyst causes problems because the oxidation reaction of methanol expressed as Equation (7) proceeds much faster than the reforming reaction of methanol defined by Equations (4) and (6) in the reformer. The exothermic reaction generally has the higher reaction rate than that of the endothermic reaction. When the endothermic reforming reaction of methanol and the exothermic oxidation reaction of methanol are carried out simultaneously, the higher rate of the oxidation reaction of methanol leads to a gradual increase in temperature of the catalyst. Another effective method to prevent deterioration of the catalyst due to an extreme increase in temperature is to suppress the exothermic oxidation reaction relative to the endothermic reforming reaction. This structure is given below as a fifth embodiment according to the present invention.

Figure 12:
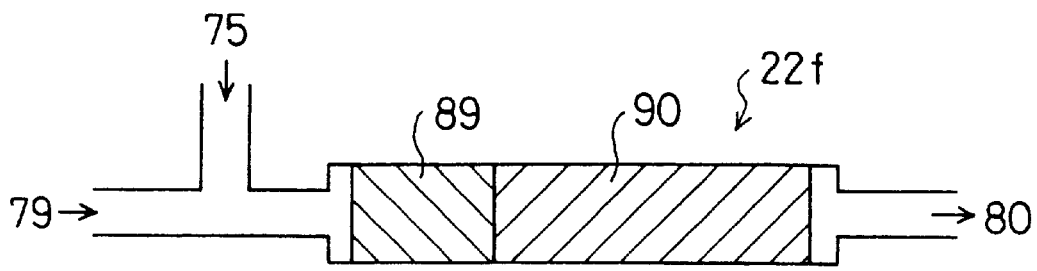
FIG. 12 schematically shows structure of another reformer 22f.

FIG. 12 shows structure of another reformer 22f as the fifth embodiment. The reformer 22f of the fifth embodiment includes two reformer units 89 and 90 that are both filled with the pellets of the reforming catalyst, that is, the Cu—Zn catalyst. The catalytic pellets packed in the two reformer units 89 and 90 have different particle sizes. The first reformer unit 89 arranged at the inlet of the raw fuel gas and the oxidizing gas is filled with the pellets of the reforming catalyst having the size of approximately 3 mm×3 mm×6 mm (hereinafter referred to as large pellets). The second reformer unit 90 arranged at the outlet of the gaseous fuel generated through the reforming reaction is filled with the pellets of the reforming catalyst having the size of approximately 3 mm×3 mm×3 mm (hereinafter referred to as small pellets). The catalytic pellets packed in the respective reformers of the first through the fourth embodiments discussed above correspond to the small pellets of the fifth embodiment. In the fifth embodiment, the raw fuel gas fed through the second fuel supply conduit 79 is mixed in advance with the compressed air fed through the first air supply conduit 75, and the oxygen-containing raw fuel gas supplied into the reformer 22f first passes through the surface of the large pellets packed in the first reformer unit 89 and then through the surface of the small pellets packed in the second reformer unit 90.

Figure 13:
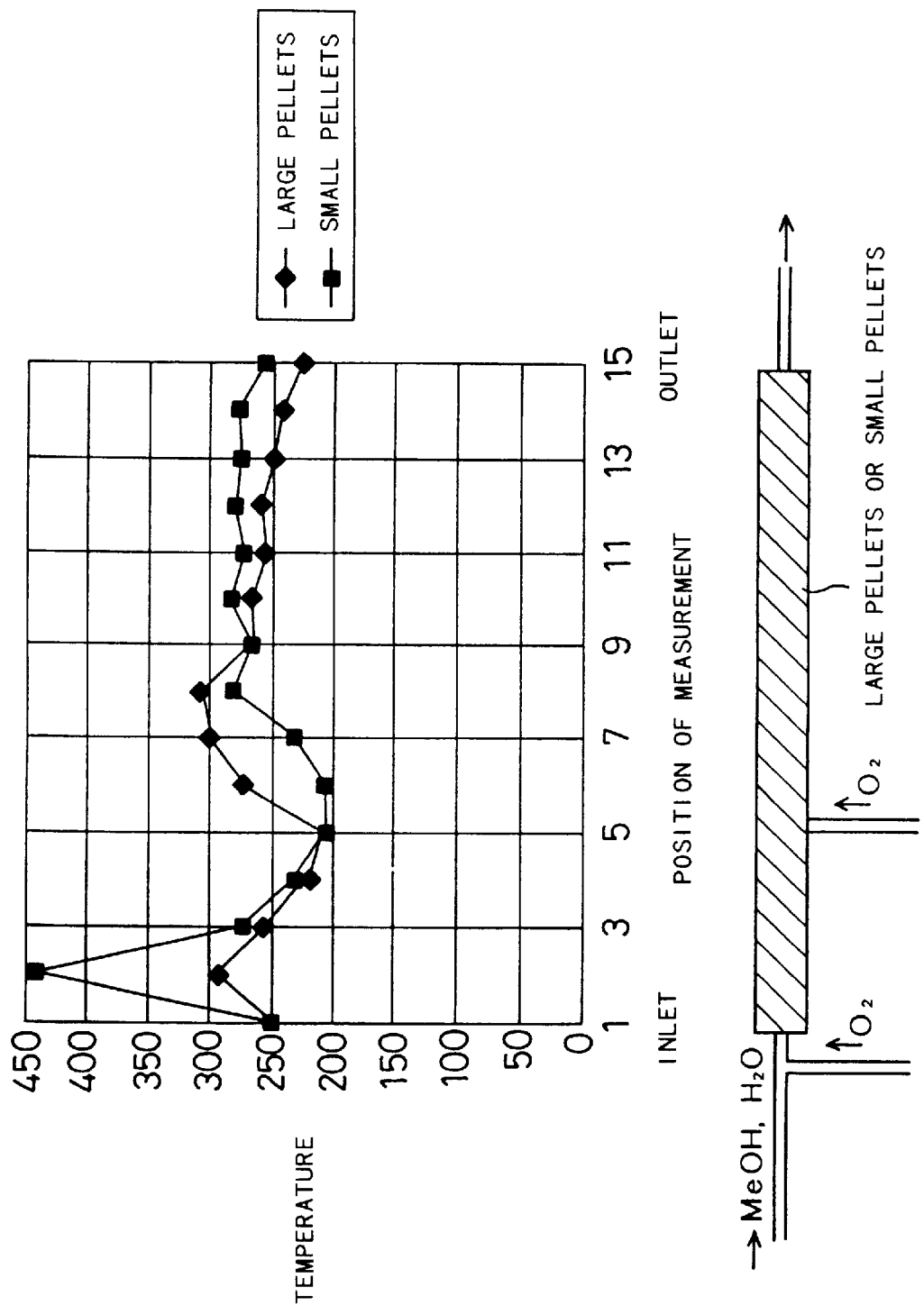
FIG. 13 is a graph showing variations in temperature of the catalyst in a reformer filled with large pellets and in a reformer filled with small pellets.

The following describes the relationship between the rates of the reforming reaction and the oxidation reaction of the raw fuel gas and the size of the pellets of the reforming catalyst, that is, the total surface area of the catalyst. FIG. 13 is a graph showing variations in temperature of the catalyst plotted against the direction of the flow of a modeled raw fuel gas (methanol 0.2 mol/min and water 0.4 mol/min), which passes through either one of the vessels that have the same shape as the reformer 22f and are filled with either the large pellets or the small pellets. The air is introduced as the oxidizing gas into the raw fuel gas from two different positions. The first position is just before the inlet of the raw fuel gas into the reforming catalyst, and the second position is approximately one third the length of the reformer from the inlet thereof (see the bottom drawing of FIG. 13). The air is introduced from these two positions into the raw fuel gas respectively at the flow of 1.75 l/min. As shown in FIG. 13, when the reformer is filled with the small pellets of the reforming catalyst, which are used in the first through the fourth embodiments, the temperature of the catalyst has a peak in the vicinity of the inlet of the reformer. When the reformer is filled with the large pellets of the reforming catalyst to have the smaller total surface area of the catalyst per unit volume than the reformer filled with the small pellets, on the other hand, no such a peak is observed in the varied temperature of the catalyst.

In the reformer filled with the small pellets to have the larger total surface area of the catalyst per unit volume, the temperature variation curve of the catalyst has a peak in the vicinity of the inlet of the reformer. This may be ascribed to the higher rate of the oxidation reaction than that of the reforming reaction, which leads to an increase in temperature of the catalyst. In the reformer filled with the large pellets to have the smaller total surface area of the catalyst per unit volume, on the other hand, the temperature variation curve of the catalyst does not have any significant peak. When the reformer is filled with the large pellets, it is accordingly assumed that the rate of the oxidation reaction does not significantly exceed the rate of the reforming reaction. This substantially balances the heat generated by the oxidation reaction with the heat consumed by the reforming reaction, which results in a gentle temperature variation and a practically uniform temperature distribution in the reformer. According to these experimental data, when the reformer is filled the large pellets of the reforming catalyst, that is, when the catalyst has the small total surface area per unit volume that can be in contact with the raw fuel gas, the rate of the oxidation reaction is slowed relative to the reforming reaction of methanol. The relative decrease in rate of the oxidation reaction with a decrease in total surface area of the catalyst may be ascribed to the following.

For oxidation of methanol, methanol is required to come into contact with oxygen on the catalyst. The smaller total surface area of the catalyst decreases the possibility of making these three essential components exist simultaneously, thereby lowering the rate of the oxidation reaction. The reforming reaction, on the other hand, requires a supply of heat energy simultaneously with bringing methanol in contact with the catalyst. The supply of heat energy is the rate-determining step as discussed below, and the decrease in total surface area of the catalyst to some extent does not significantly lower the rate of the reforming reaction of methanol. While the total amount of heat required for the reforming reaction occurring in the reformer can be supplied by the heat transmitted from the evaporator 24 and the heat generated by the oxidation reaction, the transmission rate of heat energy required for the reforming reaction is slower than the rate of the reforming reaction on the molecular level. The condition of transmitting heat energy accordingly determines the rate of the reforming reaction. In this state, the decrease in total surface area of the catalyst does not significantly affect the rate of the endothermic reforming reaction. The decrease in total surface area of the catalyst slows the relative rate of the exothermic oxidation reaction and substantially balances the exothermic reaction with the endothermic reaction, thus preventing an extreme increase in temperature of the catalyst.

The following gives another possible reason why the decrease in total surface area of the catalyst slows the relative rate of the oxidation reaction to the reforming reaction. The exothermic oxidation reaction proceeds only on the surface of the catalyst, whereas the reforming reaction is accelerated not only by the surface of the catalyst but by the catalytic metal included in the pellets. Based on this idea, the decrease in total surface area of the catalyst depresses the rate of the oxidation reaction proceeding only on the surface of the catalyst, but does not significantly affect the rate of the reforming reaction as long as the total amount of the available catalytic metal is substantially unchanged.

Figure 14:
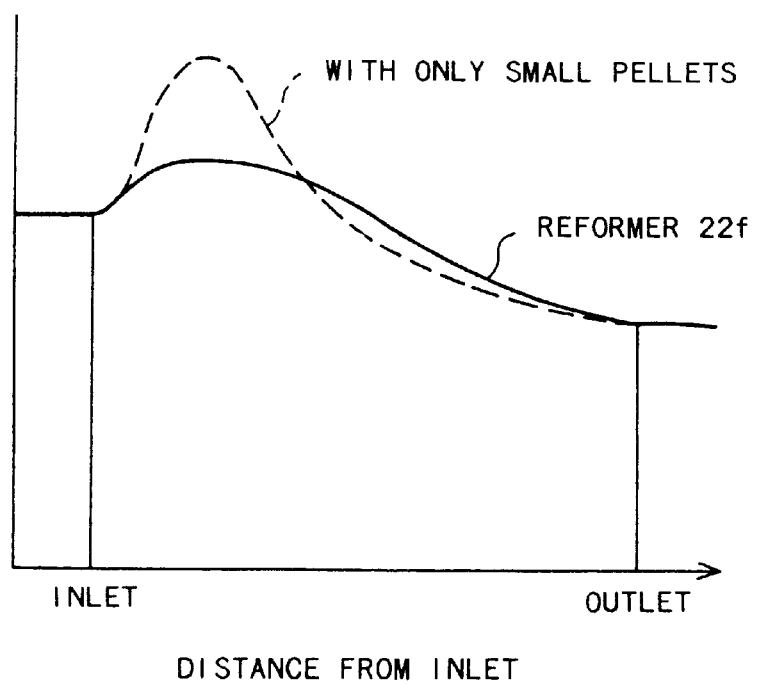
FIG. 14 is a graph showing a temperature distribution in the reformer 22f.

By taking into account these experimental results, in the reformer 22f of the fifth embodiment, the first reformer unit 89 filled with the large pellets is arranged in the upstream portion of the flow path of the raw fuel gas and the second reformer unit 90 filled with the small pellets in the downstream portion of the flow path. The smaller total surface area of the catalyst existing in the upstream portion of the reformer 22f slows the rate of the oxidation reaction of the raw fuel gas in the upstream portion and thereby prevents the temperature of the catalyst from rising too high. The larger total surface area of the catalyst existing in the downstream portion of the reformer 22f, on the other hand, secures the activity of the reforming reaction in the downstream portion. In the reformer 22f of the fifth embodiment, the ratio of the area filled with the large pellets to that filled with the small pellets is approximately one to two. FIG. 14 is a graph showing comparison between variations in temperature of the catalyst against the flow of the gas when the reforming reaction proceeds in the reformer 22f of the fifth embodiment and in a reference reformer filled with only the small pellets. As shown in FIG. 14, compared with the reforming reaction occurring in the reference reformer filled with only the small pellets, the reforming reaction occurring in the reformer 22f of the fifth embodiment results in a gentler temperature increase in the vicinity of the inlet of the reformer and a gentler temperature decrease toward the outlet.

As discussed above, the reformer 22f of the fifth embodiment has the upstream portion filled with the large pellets of the catalyst and the downstream portion filled with the small pellets. This structure changes the surface area of the catalyst per unit volume in the reformer 22f and depresses the rate of the exothermic oxidation reaction proceeding in the upstream portion relative to the rate of the endothermic reforming reaction. This effectively prevents the temperature of the catalyst from rising too high due to the heat generated by the oxidation reaction that has the higher reaction rate than that of the endothermic reaction. Since the structure of the embodiment prevents an extreme increase in temperature of the catalyst, the catalytic metal (Cu—Zn catalyst in this embodiment) is not exposed to the undesired high temperatures and is thereby free from the problems, such as deterioration of the catalyst and sintering. This structure also prevents the reactions other than the normal reforming reaction from proceeding due to an extreme increase in temperature of the catalyst and generating the undesired by-products. The downstream portion of the reformer 22f is filled with the small pellets as described previously. This secures the surface area of the reforming catalyst involved in the reforming reaction proceeding in the downstream portion of the reformer 22f, thus preventing the rate of the reforming reaction from unnecessarily being lowered. The depression of the rate of the oxidation reaction proceeding in the upstream portion of the reformer 22f expands the active area of the oxidation reaction to the downstream portion, and thereby spreads the area, which is heated to the temperatures that sufficiently activate the endothermic reforming reaction, to the further downstream portion. This leads to an improvement in efficiency of the reforming reaction per unit volume in the reformer 22f.

The reformer 22f of the fifth embodiment has the catalytic pellets of the different particle sizes in the upstream portion and the downstream portion, in order to prevent an extreme increase in temperature of the catalyst. The structure of the fifth embodiment does not require a plurality of different catalysts like the fourth embodiment, but the reformer 22f is filled with the single catalytic metal having the activities of accelerating both the reforming reaction and the oxidation reaction. Even when the whole amount of the compressed air corresponding to the required amount of oxygen is added in advance to the raw fuel gas at the inlet of the reformer 22f, the temperature distribution in the reformer 22f can be uniformed sufficiently. There is no need to introduce the oxidizing gas from a plurality of different positions. This prevents the piping system from being complicated and thereby simplifies the structure of the whole reformer 22f.

As discussed above, in the reformer 22f of the fifth embodiment, the upstream portion and the downstream portion thereof are filled with the pellets of the catalytic metal having the different particle sizes. Any other structure may, however, be applied to the reformer 22f as long as the total surface area of the catalyst in the upstream portion is different from the same in the downstream portion. By way of example, the reformer 22f may have a honeycomb structure, instead of being filled with the catalytic pellets. In this case, the respective cells constituting the honeycomb structure have different cross sectional areas in the upstream portion and the downstream portion of the reformer; that is, the cells in the upstream portion have larger cross sectional areas and those in the downstream portion have smaller cross sectional areas.

In the reformer 22f of the fifth embodiment, the ratio of the area filled with the large pellets to that filled with the small pellets is approximately one to two. As long as the same effects can be exerted to lessen the surface area of the catalyst in the upstream portion and thereby prevent an extreme increase in temperature of the catalyst, the area filled with the large pellets and that filled with the small pellets may be defined by another ratio. The reformer 22f of the fifth embodiment is filled with the pellets having the different particle sizes specified above. The sizes of the pellets are, however, not restricted to these values. In accordance with another preferable structure, the surface area of the catalyst varies in three or more steps in the reformer.

The structure of the fifth embodiment discussed above changes the surface area of the catalyst in the upstream portion and the downstream portion of the reformer, so as to depress the rate of the exothermic oxidation reaction relative to the rate of the reforming reaction and hence prevent an extreme increase in temperature of the catalyst. Still another structure given as a sixth embodiment according to the present invention changes the flow rate of the raw fuel gas passing through the upstream portion and the downstream portion in the reformer, so as to depress the rate of the exothermic oxidation reaction relative to the rate of the reforming reaction and hence prevent an extreme increase in temperature of the catalyst.

Figure 15:
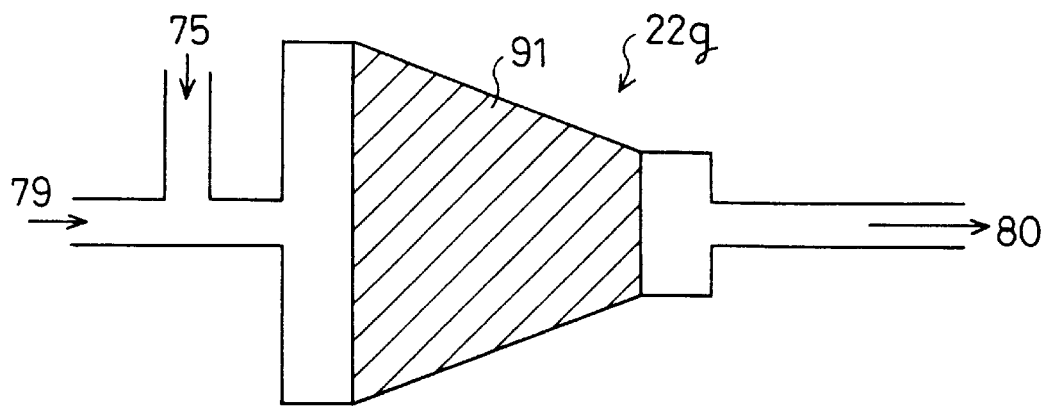
FIG. 15 schematically shows structure of another reformer 22g.

FIG. 15 illustrates structure of another reformer 22g as the sixth embodiment. The reformer 22g of the sixth embodiment includes a reformer unit 91 filled with the pellets of the reforming catalyst, that is, the Cu—Zn catalyst. A supply of the raw fuel gas is fed via the second fuel supply conduit 79 into the reformer 22g, whereas the oxidizing gas or the compressed air is supplied via the first air supply conduit 75 that joins the second fuel supply conduit 79 before the joint of the second fuel supply conduit 79 with the reformer 22g. The reformer 22g of the sixth embodiment has a truncated cone-like shape. The second fuel supply conduit 79 connects with the bottom face of the reformer 22g and the third fuel supply conduit 80 with the top face thereof. Namely the reformer 22g is constructed to form the flow path having the decreasing sectional area in the direction from the upstream portion to the downstream portion. The oxygen-containing raw fuel gas fed into the reformer 22g is pressurized to a predetermined level, and accordingly passes through the upstream portion having the greater flow section at a slower rate and through the downstream portion having the smaller flow section at a higher rate. The reformer 22g of the sixth embodiment has the specific shape to vary the flow rate of the raw fuel gas, so as to depress the rate of the exothermic oxidation reaction relative to the rate of the reforming reaction and hence prevent an extreme increase in temperature of the catalyst. The relationship between the flow rate of the gas and the reaction rate will be discussed later. In this embodiment, the flow rate of the raw fuel gas is regulated by the specific shape of the reformer 22g, and the reformer unit 91 can thus be filled with the catalytic pellets formed in a homogeneous particle size. As one preferable example, the reformer 22g of the sixth embodiment is filled with the small pellets specified in the fifth embodiment.

[0148]

The slower flow rate of the raw fuel gas in the upstream portion of the reformer 22g depresses the progress of the exothermic oxidation reaction. This is ascribed to the following reason. The slower flow rate of the raw fuel gas decreases the chance of collision between methanol molecules and water molecules and lowers the probability of enabling both methanol and water to be supplied to the oxidation reaction proceeding on the surface of the catalyst, thus suppressing the progress of the oxidation reaction. The endothermic reaction of Equation (4) among the reforming reaction decomposes methanol molecules alone on the surface of the catalyst. A large excess of methanol molecules exist even when the flow rate of the raw fuel gas is slowed to some extent. The supply of methanol molecules onto the surface of the catalyst is hence sufficient for the ability of the reforming catalyst that accelerates the reforming reaction. The rate of the reforming reaction is thus hardly affected by the slower flow rate of the raw fuel gas. The slower flow rate of the raw fuel gas in the upstream portion of the reformer accordingly slows the rate of the oxidation reaction relative to the rate of the reforming reaction in the upstream portion of the reformer.

Figure 16:
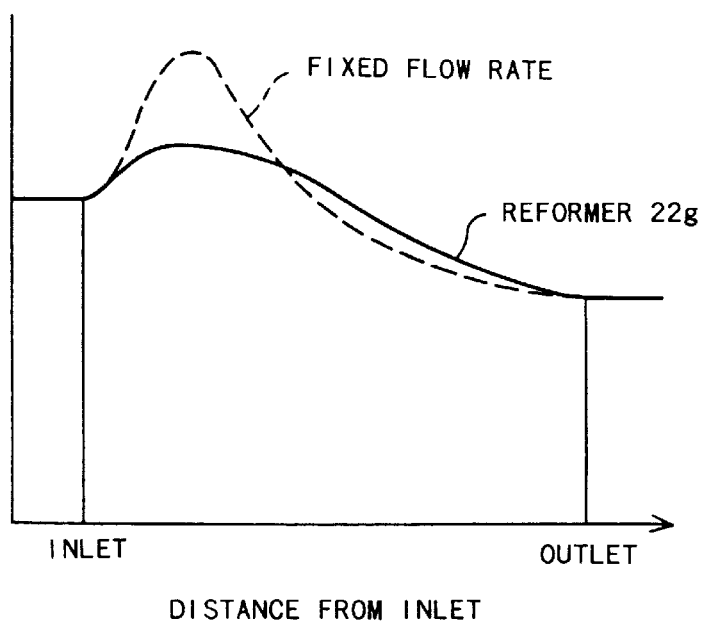
FIG. 16 is a graph showing a temperature distribution in the reformer 22g.

FIG. 16 is a graph showing comparison between variations in temperature of the catalyst against the flow of the gas when the reforming reaction proceeds in the reformer 22g of the sixth embodiment and in a reference reformer forming the flow path of a uniform sectional area. In case of the reference reformer having the uniform flow section, that is, in case that the flow rate of the raw fuel gas is fixed in the reformer, the temperature curve of the catalyst gradually increases from the inlet of the reformer to form a peak. In case of the reformer 22g of this embodiment, on the other hand, the temperature curve of the catalyst shows a gentle increase in the upstream portion having the slower flow rate of the raw fuel gas and has no significant peak that is observed in case of the fixed flow rate. The temperature curve shows a gentle decrease toward the outlet of the reformer after the gentle increase.

In the reformer 22g of the sixth embodiment discussed above, the greater cross sectional area of the flow path in the upstream portion slows the flow rate of the raw fuel gas and thereby slows the relative rate of the oxidation reaction in the upstream portion. Like the fifth embodiment, the structure of the sixth embodiment accordingly prevents the temperature of the catalyst from rising too high due to the heat generated by the oxidation reaction that has the higher reaction rate than that of the endothermic reaction. Since the structure of the embodiment prevents an extreme increase in temperature of the catalyst, the catalytic metal (Cu—Zn catalyst in this embodiment) is not exposed to the undesired high temperatures and is thereby free from the problems, such as deterioration of the catalyst and sintering. This structure also prevents the reactions other than the normal reforming reaction from proceeding due to an extreme increase in temperature of the catalyst and generating the undesired by-products. The depression of the rate of the oxidation reaction proceeding in the upstream portion of the reformer 22g expands the active area of the oxidation reaction to the downstream portion, and thereby spreads the area, which is heated to the temperatures that sufficiently activate the endothermic reforming reaction, to the further downstream portion. This leads to an improvement in efficiency of the reforming reaction per unit volume in the reformer 22g.

The reformer 22g of the sixth embodiment has the varying flow section in the upstream portion and the downstream portion, in order to prevent an extreme increase in temperature of the catalyst. The structure of the sixth embodiment does not require a plurality of different catalysts like the fourth embodiment, but the reformer 22g is filled with the single catalytic metal having the activities of accelerating both the reforming reaction and the oxidation reaction. The structure of the sixth embodiment further saves the labor of preparing the pellets of the catalytic metal since they have the uniform particle diameter. Even when the whole amount of the compressed air corresponding to the required amount of oxygen is added in advance to the raw fuel gas at the inlet of the reformer 22g, the temperature distribution in the reformer 22g can be uniformed sufficiently. There is no need to introduce the oxidizing gas from a plurality of different positions. This prevents the piping system from being complicated and thereby simplifies the structure of the whole reformer 22g.

Figure 17:
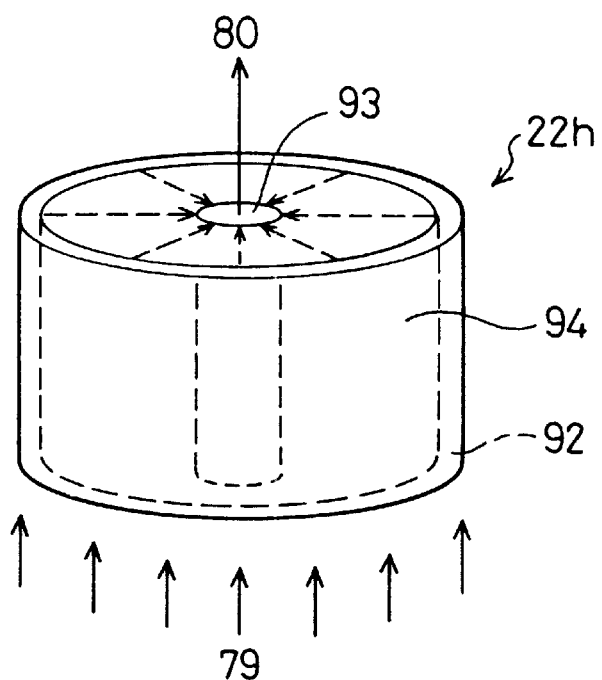
FIG. 17 schematically shows structure of still another reformer 22h.

The reformer 22g of the sixth embodiment is formed in a truncated cone-like shape to gradually decrease the sectional area of the flow path in the direction from the upstream portion to the downstream portion and thereby slow the flow rate of the raw fuel gas in the upstream portion. The reformer may have any other shape as long as the flow rate of the raw fuel gas can be slowed in the upstream portion. FIG. 17 shows a reformer 22h having another possible structure for slowing the flow rate of the raw fuel gas in the upstream portion. The reformer 22h of FIG. 17 has a substantially columnar shape and includes a raw fuel gas introduction conduit 92 formed on the circumference thereof and a reformer unit 94 arranged inside the raw fuel gas introduction conduit 92 and filled with pellets of the reforming catalyst. The raw fuel gas introduction conduit 92 formed on the outer face of the reformer 22h is open to the bottom face (in the drawing of FIG. 17) of the reformer 22h having the substantially columnar shape. The circular opening formed in the bottom face of the reformer 22h connects with the second fuel supply conduit 79, through which the raw fuel gas previously mixed with the compressed air is supplied. In the reformer 22h, the boundary between the reformer unit 94 and the raw fuel gas introduction conduit 92 is made of a metal mesh that can hold the catalytic pellets. The raw fuel gas is accordingly introduced from the raw fuel gas introduction conduit 92 formed on the circumference of the reformer 22h via the metal mesh into the reformer unit 94.

The raw fuel gas introduced from the outer face of the reformer unit 94 into the reformer 94 is subjected to the reforming reaction while passing through the surface of the reforming catalyst and being flown to the central axis of the reformer 22h. The reformer 22h has a gaseous fuel discharge conduit 93 formed along the central axis thereof. The gaseous fuel generated by reforming the raw fuel gas in the reformer 22h is flown out to the gaseous fuel discharge conduit 93. The gaseous fuel discharge conduit 93 is open to the top face (in the drawing of FIG. 17) of the reformer 22h, which is opposite to the opening of the raw fuel gas introduction conduit 92. The opening of the gaseous fuel discharge conduit 93 connects with the third fuel supply conduit 80, and the gaseous fuel generated by the reforming reaction in the reformer 22h is flown into the third fuel supply conduit 80 via the gaseous fuel discharge conduit 93.

The reformer 22h of FIG. 17 has the substantially columnar shape and receives the raw fuel gas from the raw fuel gas introduction conduit 92 formed on the outer face of the reformer 22h and discharges the resulting gaseous fuel to the gaseous fuel discharge conduit 93 formed along the central axis thereof. This varies the flow rate of the gas in the reformer 22h; that is, the slower flow rate in the upstream portion and the faster flow rate in the downstream portion. It is assumed that the plane perpendicular to the flow direction of the gas represents the section of the reformer. The section of the reformer 22h has the columnar shape having the varying area; that is, the larger sectional area in the place closer to the raw fuel gas introduction conduit 92 and the smaller sectional area in the place closer to the gaseous fuel discharge conduit 93. Namely the gas flowing in the reformer 22h has the higher flow rate when approaching the gaseous fuel discharge conduit 93. The reformer 22h of FIG. 17 accordingly exerts the same effects as those of the reformer 22g of the sixth embodiment. Compared with the reformer 22g formed in the truncated cone-like shape, the reformer 22h formed in the substantially columnar shape has a smaller dead space in installation.

Figure 18:
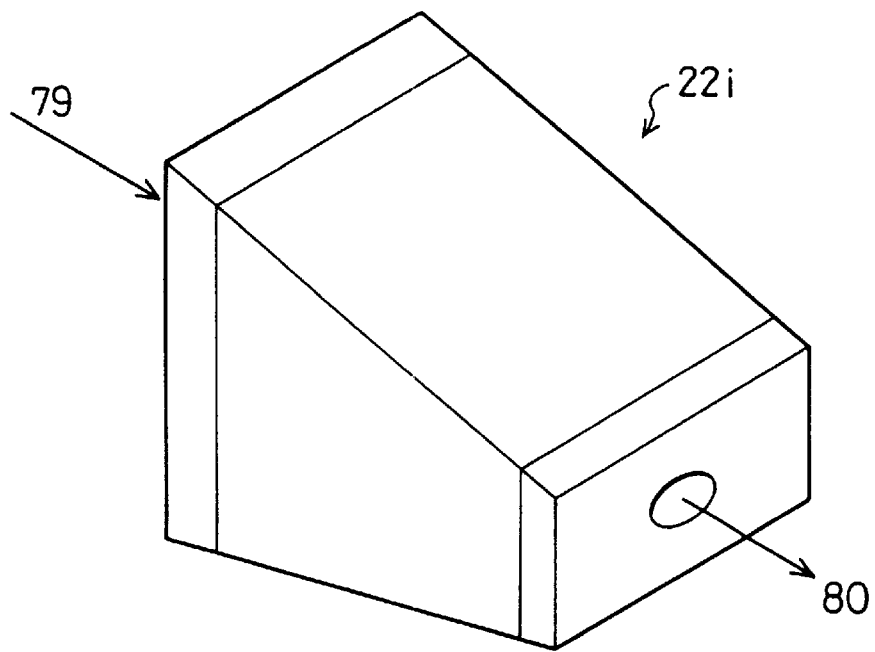
FIG. 18 schematically shows structure of another reformer 22i.

The reformer may have a rectangular cross section as still another possible structure to realize the slower flow rate in the upstream portion than that in the downstream portion. FIG. 18 illustrates structure of another reformer 22i having the rectangular cross section. The reformer 22i of FIG. 18 has a similar structure to that of the reformer 22g of the sixth embodiment, except that the reformer 22i is formed in a truncated quadrilateral pyramid-like shape instead of the truncated cone-like shape. In the reformer 22i formed in the truncated quadrilateral pyramid-like shape, the bottom face thereof having the larger area connects with the second fuel supply conduit 79, and the top face thereof having the smaller area with the third fuel supply conduit 80. The sectional area of the flow path in the reformer 22i thus constructed gradually decreases in the direction from the upstream portion to the downstream portion, so that the gas passing through the reformer 22i has the slower flow rate in the upstream portion. The reformer 22i of FIG. 18 accordingly exerts the same effects as those of the reformer 22g of the sixth embodiment.

Figure 19:
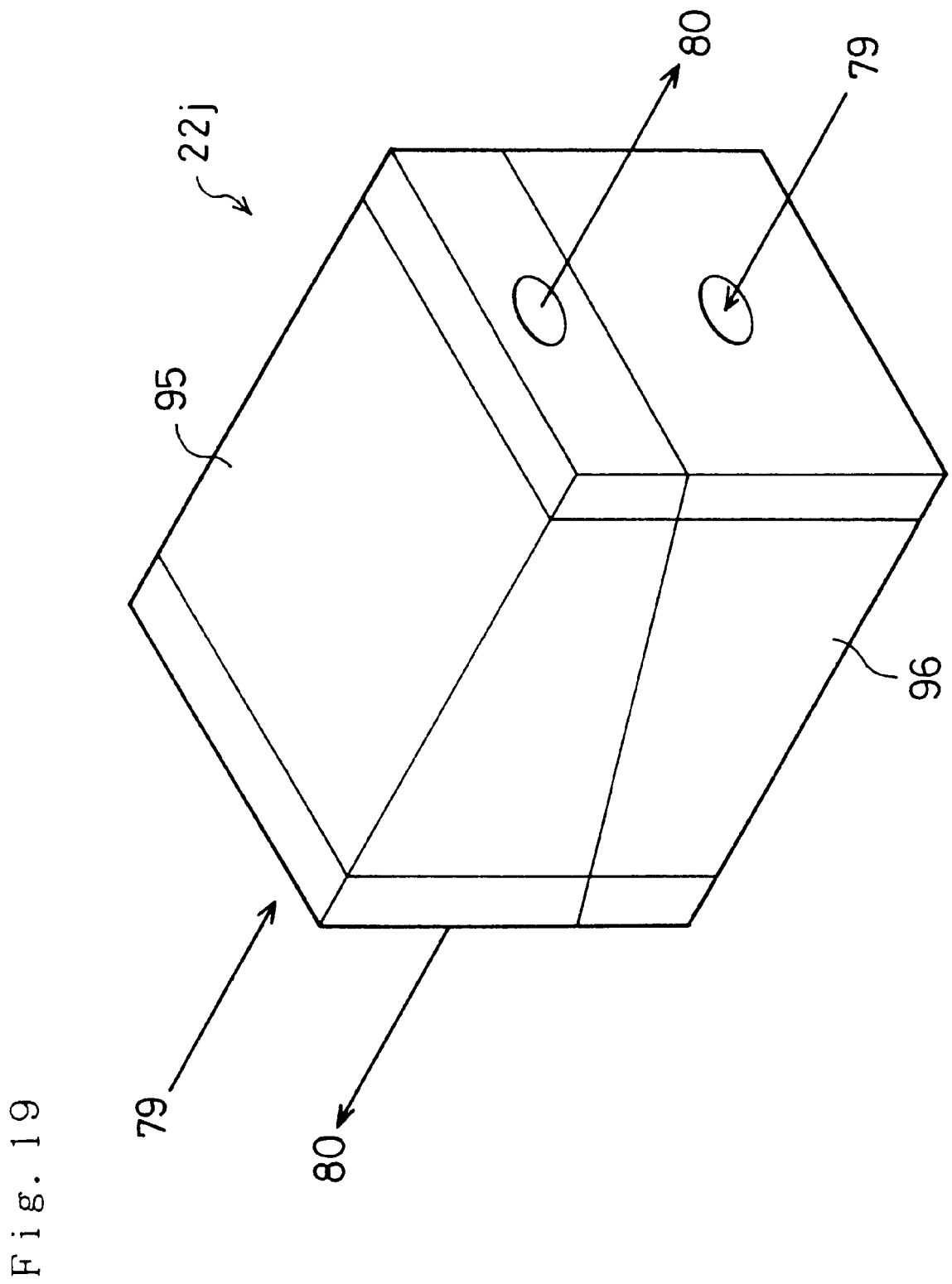
FIG. 19 schematically shows structure of still another reformer 22j.

In accordance with another preferable application, the reformer may include a plurality of reformer units that have the structure of varying the flow rate of the gas in the upstream portion and the downstream portion and are laid one upon another. FIG. 19 illustrates still another reformer 22j as an example of such stacking structure. The reformer 22j includes two reformer units 95 and 96 that are respectively formed in a truncated quadrilateral pyramid-like shape like the reformer 22i and are laid one upon the other to have the gas flows in the opposite directions. The reformer units 95 and 96 respectively receive a supply of the raw fuel gas from the bottom face thereof having the greater flow section and discharge the resulting gaseous fuel from the top face thereof having the smaller flow section.

The reformer 22j of FIG. 19 has the following effects, in addition to the same effects as those of the reformer 22g of the sixth embodiment and the reformer 22i of FIG. 18. In the reformer 22j, the two reformer units 95 and 96 are laid one upon the other to have the gas flows in the opposite directions. This structure further uniforms the temperature distribution in the reformer 22j. In the respective reformer units 95 and 96, the gas has the slower flow rate in the upstream portion. This depresses the rate of the oxidation reaction of the raw fuel gas and prevents an abrupt increase in temperature in the upstream portion of each reformer unit. The oxidation reaction proceeds more vigorously and actively in the upstream portion where the raw fuel gas has the higher content of oxygen than in the downstream portion where the raw fuel gas has the lower content of oxygen. The temperature in the upstream portion is accordingly a little higher than that in the downstream portion. In the reformer 22j, since the two reformer units 95 and 96 are laid one upon the other to have the gas flows in the opposite directions, the higher-temperature upstream portion and the lower-temperature downstream portion adjoin each other to exchange the heat and further uniform the temperature distribution in the whole reformer 22j. This structure effectively prevents the temperature in the reformer from rising too high due to the heat generated by the oxidation reaction. The increase in temperature in the downstream portion of the reformer 22j activates the reforming reaction in the downstream portion and thereby improves the reaction efficiency of the whole reformer 22j. The structure of heaping the reformer units 95 and 96 of the truncated quadrilateral pyramid-like shape to form the whole reformer 22j in a quadratic prism-like shape reduces the size of the whole reformer 22j and lessens the dead space in installation.

In the reformer of the sixth embodiment, from reformer 22g to 22j, the varying sectional area in the upstream portion and the downstream portion depresses the rate of the oxidation reaction in the upstream portion. Such effect can be attained with the pellets of the uniform particle diameter packed into the reformer. In the reformer of the sixth embodiment, from reformer 22g to 22j, however, the upstream portion of the gas flow may be filled with the catalytic pellets of the greater particle diameter and the downstream portion with those of the smaller particle diameter. This further depresses the rate of the oxidation reaction in the upstream portion and uniforms the temperature distribution in the reformer.

Figure 20:
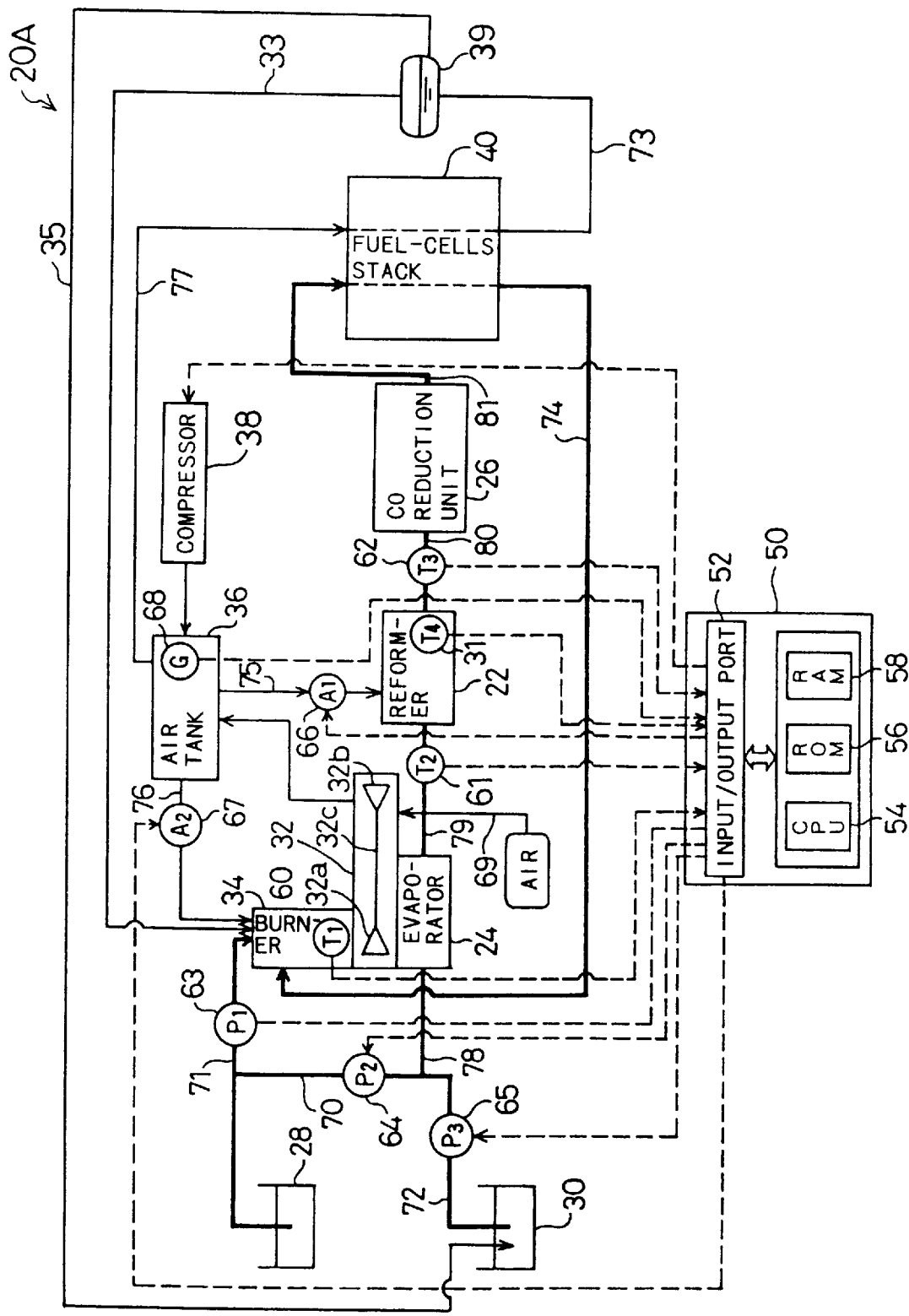
FIG. 20 is a block diagram illustrating structure of another fuel cell system 20A.

The reformers of the first through the sixth embodiments according to the present invention can be incorporated in the fuel cell system 20 constructed as shown in FIG. 1. These reformers may, however, be disposed in another fuel system having a different configuration. FIG. 20 is a block diagram illustrating another fuel cell system 20A having the structure different from that of FIG. 1. The elements of the fuel cell system 20A that are identical with those of the fuel cell system 20 of the first embodiment are shown by like numerals and are not described here.

In the fuel cell system 20A shown in FIG. 20, the oxidizing exhaust gas discharged from the oxygen electrodes of the fuel-cells stack 40 is flown via the oxidizing exhaust gas conduit 73 to a condensate recovery unit 39, instead of to the compressor 32 as in the first embodiment. The electrochemical reaction of Equation (2) occurring on the side of the oxygen electrodes of the fuel-cells stack 40 generates water. In the fuel cell system 20A, the oxidizing exhaust gas containing water generated by the cell reaction is led into the condensate recovery unit 39, in which water in the oxidizing exhaust gas is condensed and recovered for recycle. Water recovered in the condensate recovery unit 39 is supplied to the water tank 30 via a water recovery conduit 35 and then sent via the evaporator 24 to the reformer 22 to undergo the steam reforming of the raw fuel in the reformer 22.

After the recovery of water in the condensate recovery unit 39, the oxidizing exhaust gas is supplied through an exhaust gas recovery conduit 33 into the burner 34 mounted on the compressor 32. As discussed previously, oxygen remains in the oxidizing exhaust gas discharged after the electrochemical reaction in the fuel-cells stack 40. The oxidizing exhaust gas supplied to the burner 34 accordingly functions as the oxidizing gas required for the combustion reaction in the burner 34. In the fuel cell system 20A, the oxidizing exhaust gas from the fuel-cells stack 40 is led into the condensate recovery unit 39, whereas only the fresh air is supplied to the compressor element 32b of the compressor 32, which feeds the compressed air to the air tank 36.

As discussed above, in the fuel cell system having any one of the reformers of the first through the sixth embodiments, the amount of heat required for the reforming reaction is generated inside the reformer. This reduces the size of the whole fuel cell system including the reformer and simplifies the structure of the fuel cell system. The structure of the fuel cell system according to the present invention is especially advantageous when the allowable space is strictly limited, for example, when the fuel cell system is mounted as a power source for driving the electric vehicle.

The reformers of the first through the sixth embodiments discussed above reform the methanol-containing raw fuel gas to generate a hydrogen-rich gaseous fuel. Among the available hydrocarbons as the raw fuel, methanol can be subjected to the steam reforming reaction under a relatively mild condition. This property prevents the reformer from being undesirably bulky and is especially advantageous when the fuel cell system is used as a power source for driving the vehicle. The principle of the present invention is, however, applicable to the reformer for reforming another hydrocarbon-containing fuel. The following describes the reactions carried out to steam reform other hydrocarbons.

As one example, the natural gas may be used as the raw fuel. Methane, which is the primary constituent of the natural gas, is subjected to the following reforming reaction. Equation (8) represents the decomposition of methane occurring in the process of steam reforming methane, and Equations (9) and (10) respectively represent the oxidation reaction of carbon monoxide and the oxidation reaction of hydrogen carried out by addition of oxygen in the reforming reaction:

$$CH_4 + H_2O \rightarrow CO + 3H_2 - 206.2 \text{ (kJ/mol)} \quad (8)$$

$$CO + (\tfrac{1}{2})O_2 \rightarrow CO_2 + 279.5 \text{ (kJ/mol)} \quad (9)$$

$$H_2 + (\tfrac{1}{2})O_2 \rightarrow H_2O + 240 \text{ (kJ/mol)} \quad (10)$$

In the process of the steam reforming reaction of methane, methane is first decomposed by the endothermic reaction expressed as Equation (8). At the moment, methane reacts with water (that is, steam) to generate carbon monoxide and hydrogen. Carbon monoxide thus generated reacts with water according to the shift reaction expressed as Equation (5) given above to generate carbon dioxide and hydrogen. A supply of oxygen enables the reaction of Equation (9) to proceed and change carbon monoxide to carbon dioxide. Part of hydrogen generated by the decomposition of methane defined by Equation (8) is subjected to the oxidation reaction of Equation (10) to generate water. Water generated by the oxidation reaction expressed as Equation (10) is consumed by the decomposition of methane defined by Equation (8) or the shift reaction of Equation (5) for oxidizing carbon monoxide. Methane subjected to these reactions is finally reformed to a carbon dioxide-containing hydrogen rich gas. These reactions are accelerated by a catalyst, such as nickel.

In case of the reforming reaction of the methanol-containing raw fuel gas in the presence of oxygen, the amount of heat required for the endothermic reaction can be supplied by the exothermic reaction proceeding first. In case of the reforming reaction of the methane-containing fuel gas, on the other hand, the endothermic decomposing reaction of methane proceeds first and the required heat can thus not be supplied by the exothermic reforming reaction. In this case, however, the structure of sufficiently heating the methane-containing raw fuel in the evaporator prior to being fed into the reformer is favorably applied to initiate the decomposing reaction of methane expressed as Equation (8) in the reformer with the heat supplied by the methane itself. Once the decomposition of methane defined by Equation (8) is initiated, the exothermic shift reaction of Equation (5) and the exothermic oxidation reactions of Equations (9) and (10) immediately occur to supply the required heat. The decomposing reaction of methane shown by Equation (8) accordingly continues proceeding with the newly supplied heat. The raw fuel can thus be reformed in the reformer while the heat generated by the exothermic reactions balances with the heat consumed by the endothermic reactions.

In the process of steam reforming the methane-containing raw fuel gas to generate a hydrogen-rich gaseous fuel, a supply of oxygen fed to the reformer activates the exothermic oxidation reaction to supply the heat required for the endothermic decomposing reaction. Like the reforming reaction of methanol described in the first through the sixth embodiments, the amount of heat externally supplied for the endothermic reforming reaction can thus be reduced significantly. Especially when the amount of oxygen supplied to the reformer and the position of oxygen supply are controlled according to the state of the temperature distribution in the reformer and the rates of the shift reaction of Equation (5) and the exothermic oxidation reactions of Equations (9) and (10) are regulated, the required amount of heat can be supplied sufficiently. In this case, an external heat source for heating the reformer is not required. In accordance with another possible structure, a heat source may be placed in the vicinity of the inlet of the reformer to accelerate the decomposing reaction of methane defined by Equation (8). In case that the town gas is used as the natural gas, it is preferable to arrange a desulfurizer prior to the reformer, in order to remove the organic sulfur oxides added as an odorant.

The principle of the present invention is also applicable to the raw fuels other than the natural gas, for example, LPG or liquefied petroleum gas (propane as the raw fuel component), gasoline (n-octane or isooctane as the raw fuel component), and gas oil (n-hexadecane or cetane as the raw fuel component). When these raw fuels are subjected to the reforming reaction, the heat required for the endothermic reforming reaction can be supplied by the exothermic oxidation reaction occurring in the reformer. Equations (11), (12), and (13) given below respectively represent the decomposing reactions of propane, octane, and cetane:

$$C_3H_8 + 3H_2O \rightarrow 3CO + 7H_2 - 498.0 \text{ (kJ/mol)} \quad (11)$$

$$C_8H_{18} + 8H_2O \rightarrow 8CO + 17H_2 - 1260 \text{ (kJ/mol)} \quad (12)$$

$$C_{16}H_{34} + 16H_2O \rightarrow 16CO + 33H_2 - 2475 \text{ (kJ/mol)} \quad (13)$$

Like the process of steam reforming methane, when any one of the above raw fuels is subjected to the reforming reaction, a supply of oxygen to the reformer enables the shift reaction of carbon monoxide expressed as Equation (5) and the oxidation reactions of Equations (9) and (10) to proceed after the decomposition of the raw fuel. Because of the exothermic oxidation reactions proceeding inside the reformer, the amount of heat externally supplied for the endothermic reforming reaction in the reformer can be reduced significantly. Once the raw fuel gas supplied to the reformer is heated in advance to a predetermined or higher temperature or a heat source is disposed in the vicinity of the inlet of the reformer to supply the amount of heat required for the endothermic reaction, the subsequent reforming reaction can proceed without any external supply of heat.

In the above embodiments, the gaseous fuel obtained by the reforming reaction is utilized in the Polymer Electrolyte Fuel Cells. The method of and the apparatus for reforming the fuel according to the present invention are also applicable to the fuel cell system including other types of fuel cells, such as Phosphoric Acid Fuel Cells, which can receive a supply of the carbon dioxide-containing gaseous fuel. Especially when the fuel cells are used as a portable power source, the principle of the present invention is advantageously applied to simplify the structure of the system. When, for example, methanol is supplied as the raw fuel to the low-temperature fuel cells which can not receive carbon monoxide as the fuel, the principle of the present invention is favorably applied to reduce the concentration of carbon monoxide included in the gaseous fuel.

The present invention is not restricted to the above embodiments, but there may be many modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A method of reforming a hydrocarbon supplied as a crude fuel to generate a hydrogen-containing gaseous fuel through a reforming reaction of the crude fuel, said method comprising the steps of:

feeding a supply of oxygen to a crude fuel gas containing the crude fuel for an exothermic oxidation reaction of a component included in the crude fuel gas;

utilizing heat released through the oxidation reaction for an endothermic reforming reaction of the crude fuel;

specifying a ratio of the supply of oxygen to the crude fuel gas, based on a relationship between a quantity of heat generated by the oxidation reaction of the component included in the crude fuel gas and a quantity of heat required for the reforming reaction; and mixing oxygen of a specific quantity corresponding to the specified ratio with the crude fuel gas for the oxidation reaction.

2. A method in accordance with claim 1, wherein the hydrocarbon supplied as the crude fuel is methanol, and the oxidation reaction of the component included in the crude fuel gas comprises an oxidation reaction of methanol.

3. A method of reforming a hydrocarbon supplied as a crude fuel to generate a hydrogen-containing gaseous fuel through a reforming reaction of the crude fuel, said method comprising the steps of:

lowering a peak of a temperature distribution caused by heat, which is produced by an exothermic oxidation reaction for oxidizing a component included in a crude fuel gas containing the crude fuel, and expanding an area that reaches a specific temperature for activating an endothermic reforming reaction;

feeding a supply of oxygen to the crude fuel gas for the exothermic oxidation reaction of the component included in the crude fuel gas; and utilizing the heat released through the exothermic oxidation reaction for the endothermic reforming reaction of the crude fuel.

4. A fuel-reforming apparatus for reforming a hydrocarbon supplied as a crude fuel to generate a hydrogen-containing gaseous fuel through a reforming reaction of the crude fuel, said fuel-reforming apparatus comprising:

a reformer unit in which the reforming reaction proceeds;

a crude fuel supply unit which feeds a supply of a crude fuel gas containing the crude fuel to said reformer unit; and an oxygen supply unit which feeds a supply of oxygen to the crude fuel gas, wherein said reformer unit comprises:

a first catalyst which utilizes the supply of oxygen fed by said oxygen supply unit and accelerates an exothermic oxidation reaction of a component included in the crude fuel gas; and a second catalyst which utilizes heat produced by the oxidation reaction and accelerates an endothermic reforming reaction, and wherein said oxygen supply unit comprises:

an oxygen supply control unit which specifies a ratio of the supply of oxygen to the crude fuel gas, based on a relationship between a quantity of heat generated by the oxidation reaction and a quantity of heat required for the reforming reaction, and feeds oxygen of a specific amount corresponding to the specified ratio to the crude fuel gas.

5. A fuel-reforming apparatus in accordance with claim 4, wherein the hydrocarbon supplied as the crude fuel is methanol, and the oxidation reaction of the component included in the crude fuel gas comprises an oxidation reaction of methanol.

6. A fuel-reforming apparatus for reforming a hydrocarbon supplied as a crude fuel to generate a hydrogen-containing gaseous fuel through a reforming reaction of the crude fuel, wherein the hydrocarbon supplied as the crude fuel in methanol, said fuel-reforming apparatus comprising:

a reformer unit in which the reforming reaction proceeds;

a crude fuel supply unit which feeds a supply of a crude fuel gas containing the methanol to said reformer unit; and an oxygen supply unit which feeds a supply of oxygen to the crude fuel gas, wherein said reformer unit comprises:

a reforming catalyst having a first activity and a second activity, said first activity utilizing the supply of oxygen fed by said oxygen supply unit and accelerating an exothermic oxidation reaction of the methanol that accompanies evolution of gaseous hydrogen, said second activity utilizing heat produced by the oxidation reaction and accelerating an endothermic reforming reaction.

7. A fuel-reforming apparatus in accordance with claim 6, wherein said reforming catalyst is a copper-containing catalyst.

8. The fuel-reforming apparatus of claim 4, further comprising temperature sensors for measuring the temperature of the oxygen and crude fuel gas, the reformer unit, and the hydrogen-containing gaseous fuel.

9. A fuel-reforming apparatus for reforming a hydrocarbon supplied as a crude fuel to generate a hydrogen-containing gaseous fuel through a reforming reaction of the crude fuel, said fuel-reforming apparatus comprising:

a reformer unit in which the reforming reaction proceeds;

a crude fuel supply unit which feeds a supply of a crude fuel gas containing the crude fuel to said reformer unit; and an oxygen supply unit which feeds a supply of oxygen to the crude fuel gas, wherein said reformer unit comprises:
a first catalyst which utilizes the supply of oxygen fed by said oxygen supply unit and accelerates an exothermic oxidation reaction of a component included in the crude fuel gas; and
a second catalyst which utilizes heat produced by the oxidation reaction and accelerates an endothermic reforming reaction, said fuel-reforming apparatus further comprising:
a temperature distribution averaging means for lowering a peak of a temperature distribution caused in said reformer unit by the heat, which is produced by the oxidation reaction, and expanding an area having temperature for activating the endothermic reforming reaction in said reformer unit.

10. A fuel-reforming apparatus for reforming a hydrocarbon supplied as a crude fuel to generate a hydrogen-containing gaseous fuel through a reforming reaction of the crude fuel, said fuel-reforming apparatus comprising:
a reformer unit in which the reforming reaction proceeds;
a crude fuel supply unit which feeds a supply of a crude fuel gas containing the crude fuel to said reformer unit; and
an oxygen supply unit which feeds a supply of oxygen to the crude fuel gas, wherein said reformer unit comprises:
a reforming catalyst having a first activity and a second activity, said first activity utilizing the supply of oxygen fed by said oxygen supply unit and accelerating an exothermic oxidation reaction of the crude fuel that accompanies evolution of gaseous hydrogen, said second activity utilizing the heat produced by the oxidation reaction and accelerating an endothermic reforming reaction, said fuel-reforming apparatus further comprising:
a temperature distribution averaging means for lowering a peak of a temperature distribution caused in said reformer unit by the heat, which is produced by the oxidation reaction, and expanding an area having temperature for activating the endothermic reforming reaction in said reformer unit.

11. An apparatus in accordance with claim 10, wherein said temperature distribution averaging means comprises a plurality of said oxygen supply means arranged along a flow of said raw fuel gas in said reformer unit.

12. An apparatus in accordance with claim 10, wherein said temperature distribution averaging means comprises heat dispersion means for dispersing heat generated by said exothermic oxidation reaction of the specified component through heat transmission in said reformer unit.

13. An apparatus in accordance with claim 10, wherein said temperature distribution averaging means comprises said reformer unit having a first portion close to inlets of said raw fuel gas and oxygen and a second portion close to an outlet of said gaseous fuel generated by said endothermic reforming reaction, a total surface area of said catalyst existing in said first portion being smaller than a total surface area of said catalyst existing in said second portion.

14. An apparatus in accordance with claim 10, wherein said temperature distribution averaging means comprises said reformer unit having a first portion close to inlets of said raw fuel gas and oxygen and a second portion close to an outlet of said gaseous fuel generated by said endothermic reforming reaction, said first portion having a greater flow sectional area than that of said second portion.

15. A fuel cell system comprising a fuel-reforming apparatus in accordance with claim 10 and a fuel cell for receiving a supply of said gaseous fuel from said fuel-reforming apparatus and generating electrical energy.

16. A fuel-reforming apparatus for reforming a hydrocarbon supplied an a crude fuel to generate a hydrogen-containing gaseous fuel through a reforming reaction of the crude fuel, said fuel-reforming apparatus comprising:
a reformer unit in which the reforming reaction proceeds;
a crude fuel supply unit which feeds a supply of a crude fuel gas containing the crude fuel to said reformer unit; and
an oxygen supply unit which feeds a supply of oxygen to the crude fuel gas, wherein said reformer unit comprises:
a reforming catalyst having a first activity and a second activity, said first activity utilizing the supply of oxygen fed by said oxygen supply unit and accelerating an exothermic oxidation reaction of the crude fuel that accompanies evolution of gaseous hydrogen, said second activity utilizing the heat produced by the oxidation reaction and accelerating an endothermic reforming reaction, said fuel-reforming apparatus further comprising
a plurality of oxygen supply elements arranged along a flow of said crude fuel gas in said reformer unit.

17. A fuel-reforming apparatus for reforming a hydrocarbon supplied an a crude fuel to generate a hydrogen-containing gaseous fuel through a reforming reaction of the crude fuel, said fuel-reforming apparatus comprising:
a reformer unit in which the reforming reaction proceeds;
a crude fuel supply unit which feeds a supply of a crude fuel gas containing the crude fuel to said reformer unit; and
an oxygen supply unit which feeds a supply of oxygen to the crude fuel gas, wherein said reformer unit comprises:
a reforming catalyst having a first activity and a second activity, said first activity utilizing the supply of oxygen fed by said oxygen supply unit and accelerating an exothermic oxidation reaction of the crude fuel that accompanies evolution of gaseous hydrogen, said second activity utilizing the heat produced by the oxidation reaction and accelerating an endothermic reforming reaction, said fuel-reforming apparatus further comprising
at least one pipe having heat dispersion characteristics.

18. A fuel-reforming apparatus for reforming a hydrocarbon supplied an a crude fuel to generate a hydrogen-containing gaseous fuel through a reforming reaction of the crude fuel, said fuel-reforming apparatus comprising:
a reformer unit in which the reforming reaction proceeds;
a crude fuel supply unit which feeds a supply of a crude fuel gas containing the crude fuel to said reformer unit; and
an oxygen supply unit which feeds a supply of oxygen to the crude fuel gas, wherein said reformer unit comprises:
  a reforming catalyst having a first activity and a second activity, said first activity utilizing the supply of oxygen fed by said oxygen supply unit and accelerating an exothermic oxidation reaction of the crude fuel that accompanies evolution of gaseous hydrogen, said second activity utilizing the heat produced by the oxidation reaction and accelerating an endothermic reforming reaction,
  wherein said reformer unit has a first portion close to inlets of said crude fuel gas and oxygen and a second portion close to an outlet of said gaseous fuel generated by said endothermic reforming reaction, a total surface area of said catalyst existing in said first portion being smaller than a total surface area of said catalyst existing in said second portion.

19. A fuel-reforming apparatus for reforming a hydrocarbon supplied an a crude fuel to generate a hydrogen-containing gaseous fuel through a reforming reaction of the crude fuel,
  said fuel-reforming apparatus comprising:
    a reformer unit in which the reforming reaction proceeds;
    a crude fuel supply unit which feeds a supply of a crude fuel gas containing the crude fuel to said reformer unit; and
    an oxygen supply unit which feeds a supply of oxygen to the crude fuel gas,
  wherein said reformer unit comprises:
    a reforming catalyst having a first activity and a second activity, said first activity utilizing the supply of oxygen fed by said oxygen supply unit and accelerating an exothermic oxidation reaction of the crude fuel that accompanies evolution of gaseous hydrogen, said second activity utilizing the heat produced by the oxidation reaction and accelerating an endothermic reforming reaction,
  wherein said reformer unit has a first portion close to inlets of said crude fuel gas and oxygen and a second portion close to an outlet of said gaseous fuel generated by said endothermic reforming reaction, said first portion having a greater flow sectional area than that of said second portion.

20. The method of reforming a hydrocarbon of claim 1, wherein said relationship is determined by measuring the temperature inside the reformer unit.

* * * * *

UNITED STATES PATENT AND TRADEMARK OFFICE
CERTIFICATE OF CORRECTION

PATENT NO.     : 6,165,633                                                   Page 1 of 1
DATED          : December 26, 2000
INVENTOR(S)    : Yoshimasa Negishi It is certified that error appears in the above-identified patent and that said Letters Patent is hereby corrected as shown below:

Column 41,
Lines 25 and 46, "crude fuel," should read -- crude fuel in a reformer unit, --;
Line 31, "crude fuel;" should read -- crude fuel in the reformer unit; --;
Line 32, "ratio of the supply of oxygen" should read -- ratio of oxygen --;
Line 48, "a peak of a temperature distribution" should read -- the peak temperature in the reformer unit --;
Line 49, "heat, which" should read -- heat which --; and
Lines 51-52, "and expanding an area" should read -- thereby increasing the volume the reformer unit --.

Column 42,
Line 19, "reaction, and" should read -- reaction and --;
Line 49, "reforming reaction." should read -- reforming reaction and said reforming catalyst is a copper-containing catalyst. --; and
Lines 50-52, delete Claim 7, in its entirety.

Signed and Sealed this

Second Day of July, 2002

Attest:

Attesting Officer

JAMES E. ROGAN
*Director of the United States Patent and Trademark Office*